United States Patent [19]

Taoda

[11] Patent Number: 5,241,626
[45] Date of Patent: Aug. 31, 1993

[54] IMAGE PROCESSING APPARATUS HAVING IMPROVED TWO-DIMENSIONAL ADDRESS GENERATOR

[75] Inventor: Masami Taoda, Yokohama, Japan

[73] Assignee: Kabushiki Kaisha Toshiba, Kawasaki, Japan

[21] Appl. No.: 721,686

[22] Filed: Jun. 26, 1991

[30] Foreign Application Priority Data

Jun. 26, 1990 [JP] Japan .................................. 2-165610

[51] Int. Cl.$^5$ ............................................. G06F 15/00
[52] U.S. Cl. .................................... 395/166; 395/164; 395/137; 340/727; 382/46
[58] Field of Search ....................... 395/137, 164, 166; 382/46; 340/727, 750

[56] References Cited

U.S. PATENT DOCUMENTS

| | | | |
|---|---|---|---|
| 4,618,991 | 10/1986 | Tabata et al. ....................... | 340/727 |
| 4,637,057 | 1/1987 | Kermisch ........................... | 340/727 |
| 4,759,076 | 7/1988 | Tanaka et al. ..................... | 340/727 |
| 4,884,220 | 11/1989 | Dawson ............................. | 395/137 |
| 4,930,088 | 5/1990 | Horiguchi .......................... | 395/137 |
| 4,939,642 | 7/1990 | Blank ................................. | 364/200 |
| 4,947,344 | 8/1990 | Hayashi et al. .................... | 395/137 |
| 4,985,849 | 1/1991 | Hideaki .............................. | 395/137 |
| 5,081,700 | 1/1992 | Crozier .............................. | 395/137 |
| 5,095,422 | 3/1992 | Horiguchi .......................... | 340/727 |

Primary Examiner—Dale M. Shaw
Assistant Examiner—Kee M. Tung
Attorney, Agent, or Firm—Cushman, Darby & Cushman

[57] ABSTRACT

First parameters such as a main scanning repetition count, a subscanning repetition count, and the like are calculated in accordance with an instructed rotation angle. An arithmetic content according to the instructed rotation angle is read out from a memory for storing arithmetic contents for determining second parameters according to rotation angles, and the second parameter is calculated based on the readout arithmetic content. Main scanning and subscanning addresses are generated in accordance with the calculated second parameter and the detected first parameters. Whether or not the generated subscanning address is changed is detected. If it is detected that the subscanning address is changed, a subscanning address is generated using a subscanning step count upon a change in address as the second parameter. The input image is stored in the bit map memory in accordance with the generated main scanning and subscanning addresses. In order to generate addresses for a rotated figure free from gaps, the Bresenham's line generation algorithm is used in the main scanning direction, and subscanning addresses (start points of lines) are generated in accordance with an angle.

8 Claims, 20 Drawing Sheets

| ROTATION ANGLE | MDX | MDY | SDX | SDY | RDX | RDY |
|---|---|---|---|---|---|---|
| $0 \leq \theta \leq \pi/4$ | 1 | $-\tan\theta$ | $\sin\theta\cos\theta$ | 1 | $\sin\theta\cos\theta$ | $1-\tan\theta$ |
| $\pi/4 \leq \theta \leq \pi/2$ | $1/\tan\theta$ | $-1$ | 1 | $\sin\theta\cos\theta$ | $1-1/\tan\theta$ | $\sin\theta\cos\theta$ |
| $\pi/2 \leq \theta \leq 3\pi/4$ | $1/\tan\theta$ | $-1$ | 1 | $\sin\theta\cos\theta$ | $1+1/\tan\theta$ | $\sin\theta\cos\theta$ |
| $3\pi/4 \leq \theta \leq \pi$ | $-1$ | $\tan\theta$ | $-\sin\theta\cos\theta$ | $-1$ | $-\sin\theta\cos\theta$ | $-1-\tan\theta$ |
| $\pi \leq \theta \leq 5\pi/4$ | $-1$ | $\tan\theta$ | $-\sin\theta\cos\theta$ | $-1$ | $-\sin\theta\cos\theta$ | $-1+\tan\theta$ |
| $5\pi/4 \leq \theta \leq 3\pi/2$ | $-1/\tan\theta$ | 1 | $-1$ | $-\sin\theta\cos\theta$ | $-1+1/\tan\theta$ | $-\sin\theta\cos\theta$ |
| $3\pi/2 \leq \theta \leq 7\pi/4$ | $-1/\tan\theta$ | 1 | $-1$ | $-\sin\theta\cos\theta$ | $-1-1/\tan\theta$ | $-\sin\theta\cos\theta$ |
| $7\pi/4 \leq \theta \leq 2\pi$ | 1 | $-\tan\theta$ | $\sin\theta\cos\theta$ | 1 | $\sin\theta\cos\theta$ | $1+\tan\theta$ |

FIG. 4

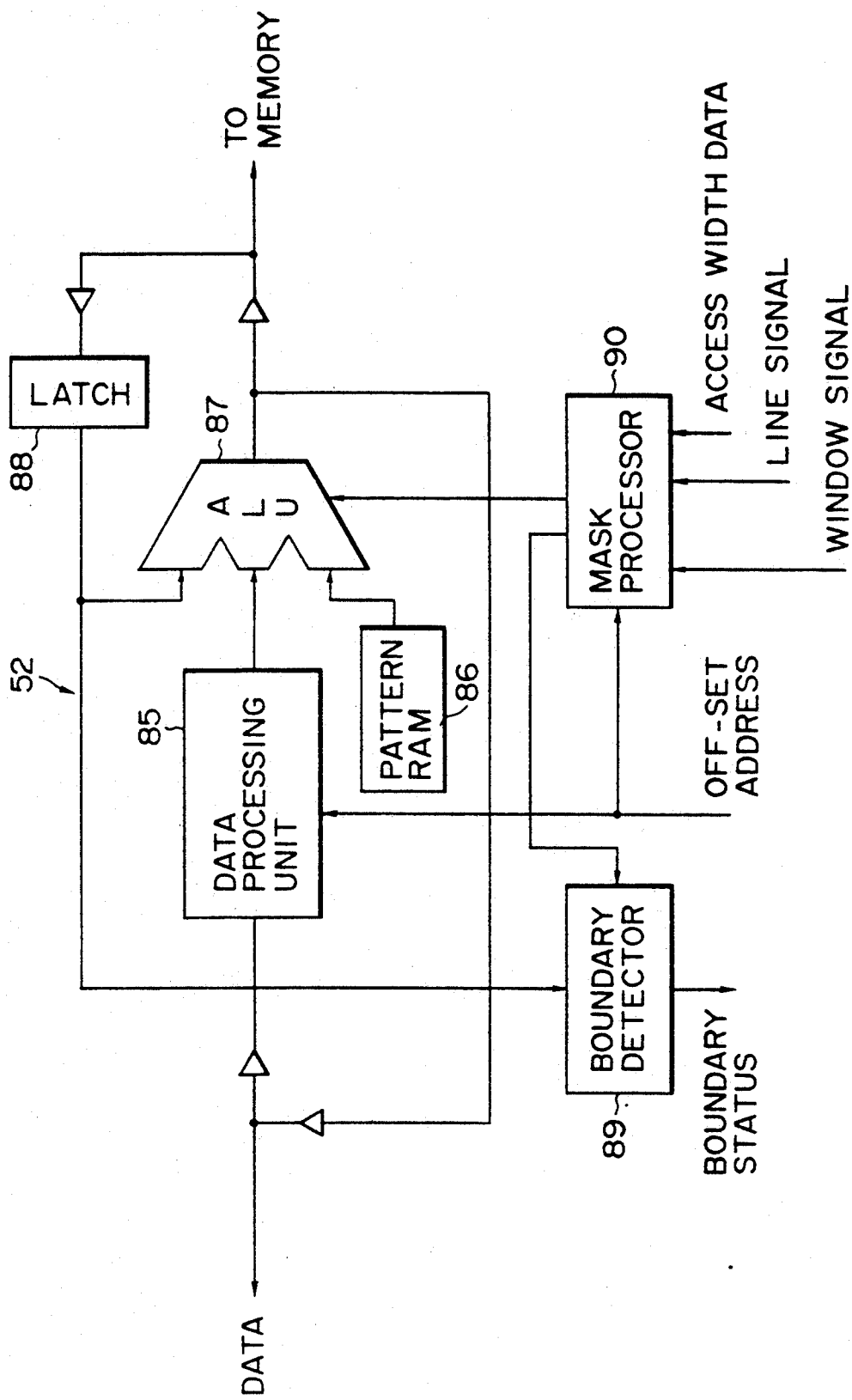
F I G. 8

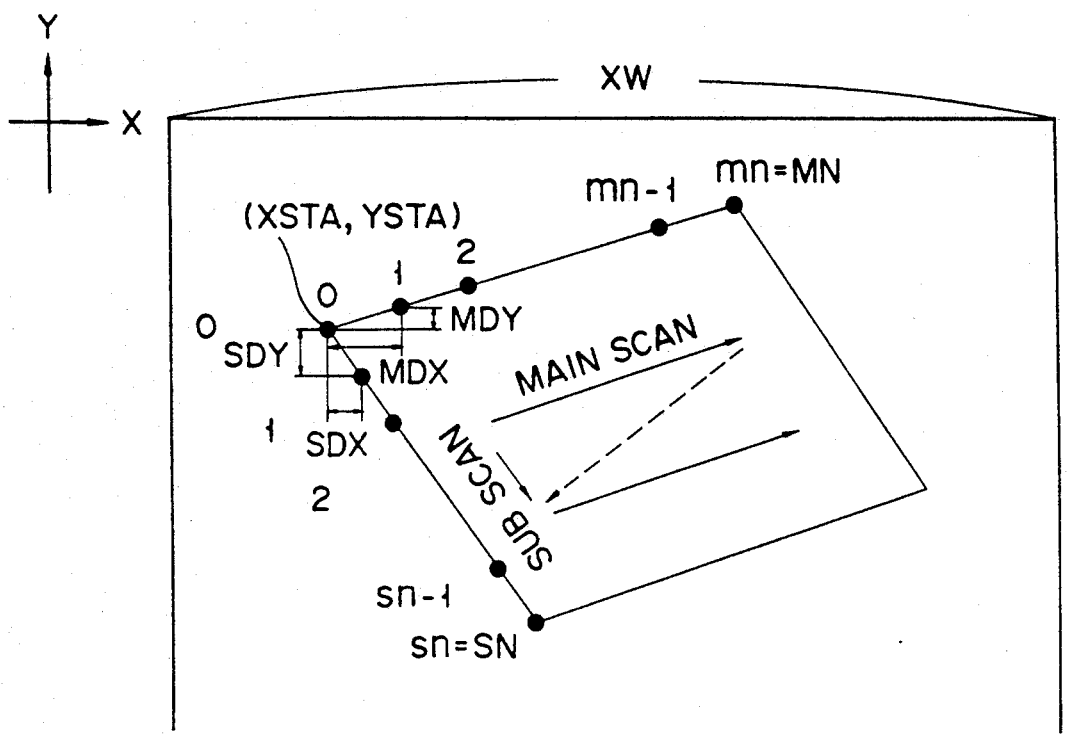
F I G. 13A
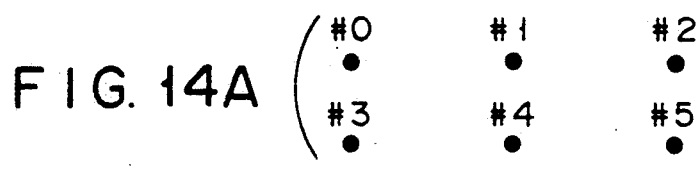
F I G. 14A

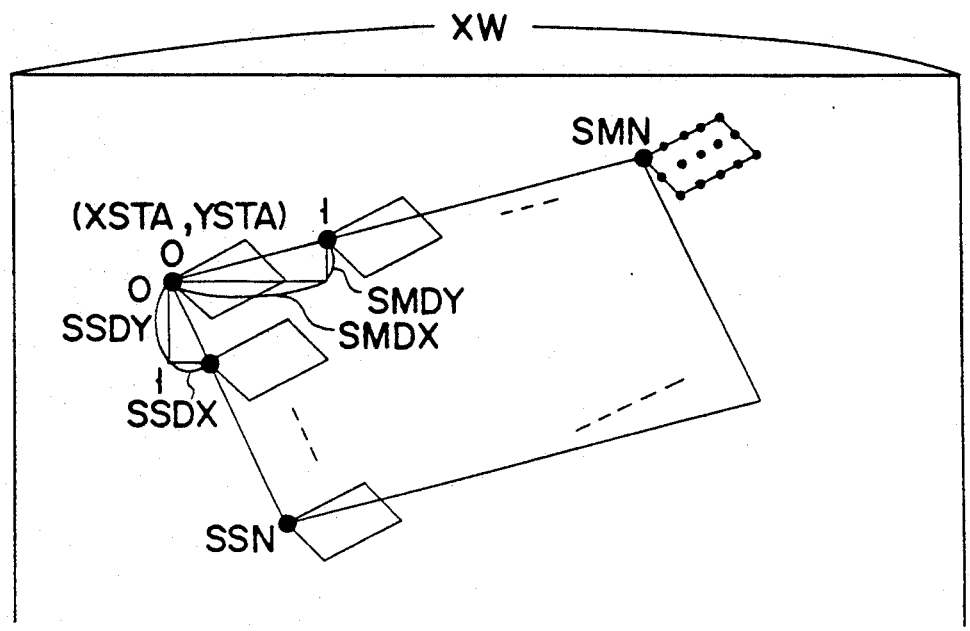
F I G. 13B
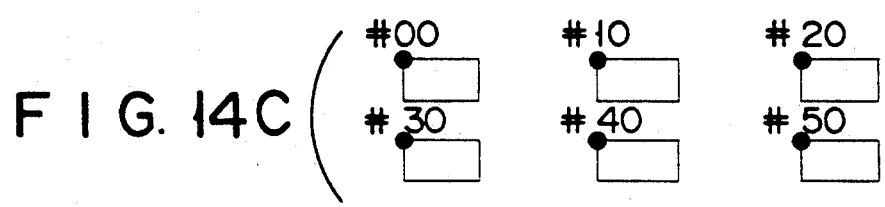
F I G. 14C

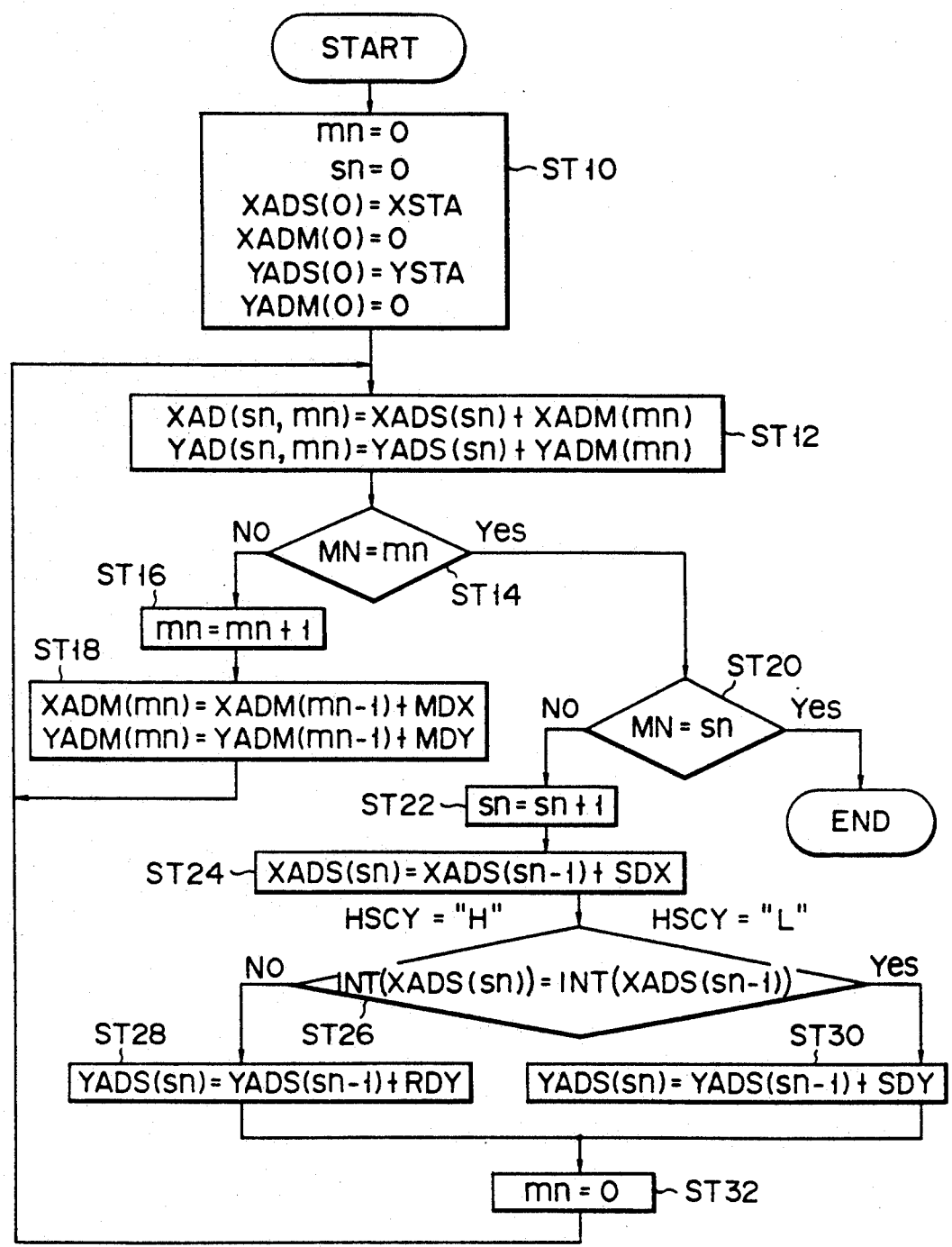
F I G. 20

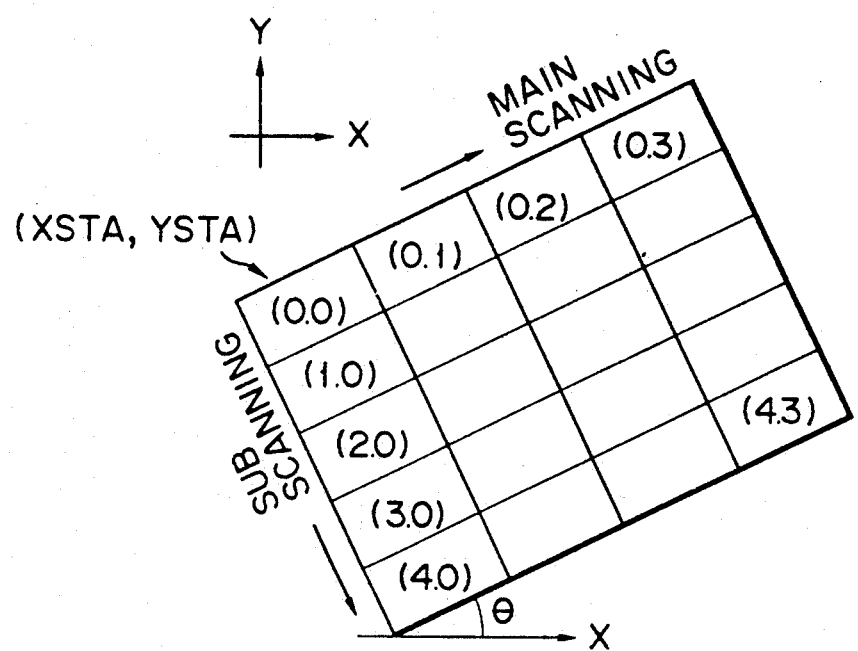
F I G. 21

IMAGE PROCESSING APPARATUS HAVING IMPROVED TWO-DIMENSIONAL ADDRESS GENERATOR

BACKGROUND OF THE INVENTION

1. Field of the Invention

The present invention relates to an image processing apparatus having a two-dimensional address generator for generating addresses of a two-dimensional rectangular region and addresses of an affine-transformed parallelogram, or addresses of a rotated figure so as to designate an access position of a bit map memory.

2. Description of the Related Art

Along with an increase in popularity of an image processing apparatus, having a bit map memory, for processing document images of, e.g., general documents, figures, and the like, generation of two-dimensional addresses for high-speed access and high-speed copying operations of a two-dimensional rectangular region, generation of high-quality rotated addresses, and the like have become important.

In a conventional method, when rotated addresses at an arbitrary angle are to be generated, pixels in the rotated figure area are omitted. In order to prevent omission of pixels, the same address must be generated a plurality of times, or one pixel must be accessed a plurality of times. When the same address must be repetitively accessed, an inter-pixel arithmetic operation cannot be performed.

SUMMARY OF THE INVENTION

It is an object of the present invention to provide an image processing apparatus which can generate rotated addresses without accessing the same pixel a plurality of times, and without causing omission of pixels in a rotated figure area when rotated addresses are to be generated at an arbitrary angle.

According to the present invention, a rotation angle or a size of an input image is instructed, and first parameters (MDX, MDY, . . . , etc. in FIG. 4) such as a main scanning repetition count, a subscanning repetition count, a main scanning repetition count of a leading address, a subscanning repetition count of the leading address, and the like are calculated. Arithmetic contents according to the instructed rotation angle are read out from a memory (1a) for storing arithmetic contents for determining second parameters (contents of a table shown in FIG. 4) according to the rotation angle ($\alpha$ in FIG. 4), and the second parameters are calculated based on the readout arithmetic contents. A main scanning address (one-dimensional address in an X direction) and a subscanning address (one-dimensional address in a Y direction) are generated in accordance with the calculated second parameters and the calculated first parameters. It is detected whether or not the generated subscanning address is changed. If it is detected that the subscanning address is changed, a new subscanning address is generated using a subscanning step count when the address is changed as a second parameter. The input image is stored in a bit map memory in accordance with the generated main scanning and subscanning addresses.

In order to generate addresses for a rotated figure without forming a gap, the Bresenham's line generation algorithm is used in the main scanning direction, and subscanning addresses (start points of lines) can be generated in accordance with an angle.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1 to 21 show an embodiment of the present invention, in which:

FIG. 1 is a block diagram showing the overall arrangement of an image processing apparatus;

FIG. 2 is a block diagram showing the content of a main controller;

FIG. 3 is a block diagram showing an arrangement of a CPU bus control logic controller;

FIG. 4 shows an arithmetic table including parameters in accordance with rotation angles;

FIG. 5 is a block diagram showing an arrangement of an image bus control logic controller;

FIG. 6 is a block diagram showing peripheral circuitry of a dual port memory;

FIG. 7 is a block diagram showing the internal arrangement of an address generator;

FIG. 8 is a block diagram showing the internal arrangement of a data processor;

FIG. 9 is a block diagram showing an arrangement of an address generator in the address generation unit;

FIG. 10 is a block diagram showing the internal arrangement of an X address generator;

FIG. 11 is a block diagram showing the internal arrangement of an X-leading address generator;

FIG. 12 is a block diagram showing the internal arrangement of a control unit shown in FIG. 9;

FIGS. 13A and 13B are charts for explaining parameters of the address generation unit;

FIGS. 14A and 14C are views for explaining address generation without causing pixel omission;

FIG. 15 is a view for explaining line address generation;

FIG. 16 is a view for explaining address generation free from address omission;

FIG. 17 is a view for explaining calculations of subscanning addresses;

FIG. 18 is a view showing generated subscanning address;

FIG. 19 is a view showing generated 30°-rotated addresses;

FIG. 20 is a flow chart for explaining a case wherein rotated addresses are generated in a software manner; and FIG. 21 is an address chart for explaining the flow chart shown in FIG. 20.

DETAILED DESCRIPTION OF THE PREFERRED EMBODIMENTS

Figure 1:
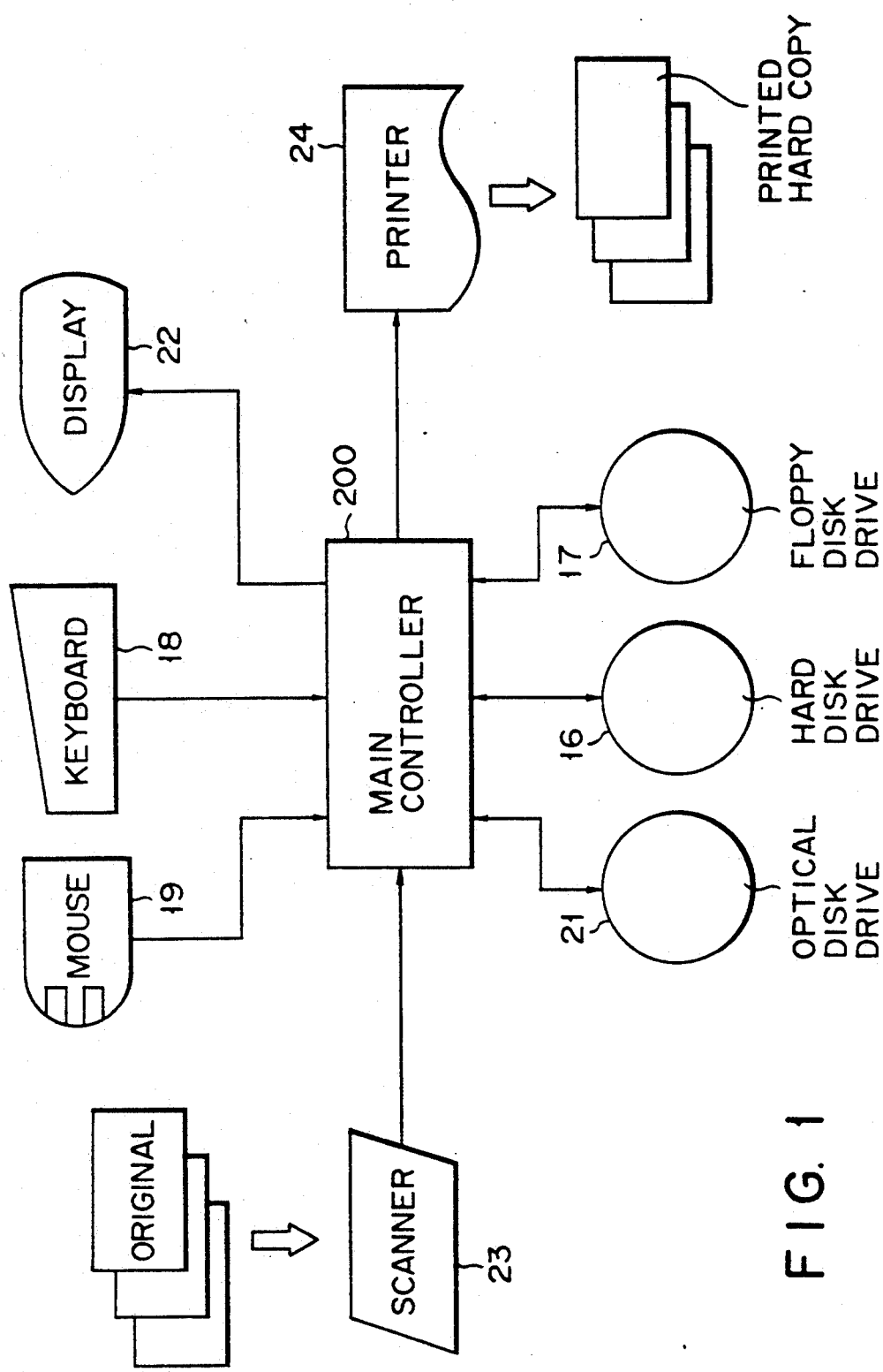
Figure 2:
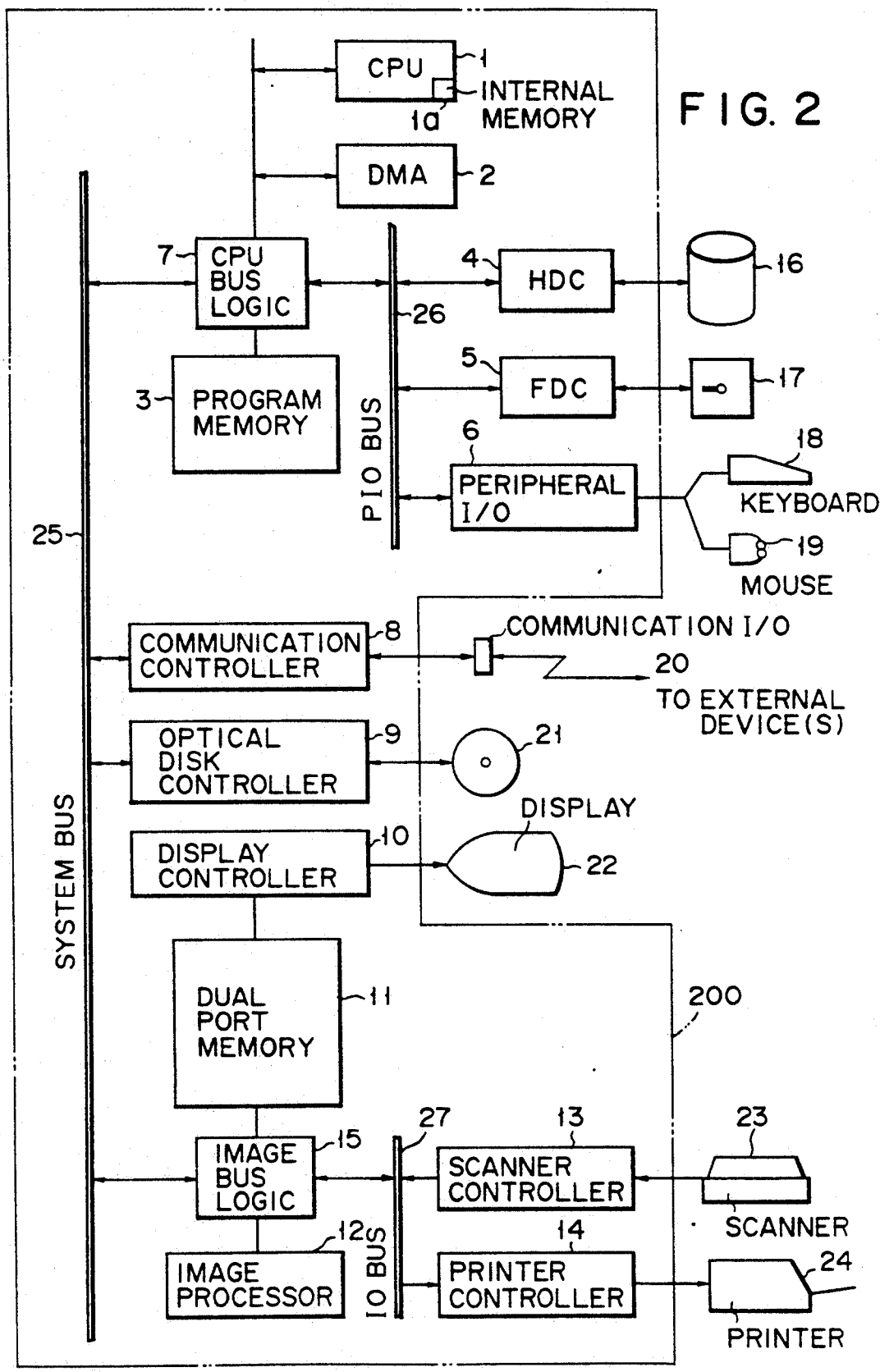

An embodiment of the present invention will be described below with reference to the accompanying drawings. FIGS. 1 and 2 show an arrangement of an image processing apparatus according to the present invention.

FIG. 1 shows the overall arrangement of an image processing apparatus according to an embodiment of the present invention. More specifically, main controller 200 including an address generation mechanism according to the present invention is connected to scanner 23 as an image input device, and is connected to printer 24 as an output device. Main controller 200 is operated using mouse 19 and/or keyboard 18 while monitoring display 22. Data used by main controller 200 are appropriately stored in floppy disk drive 17, hard disk drive 16, and optical disk drive 21.

In FIG. 2, central processing unit (to be referred to as "CPU" hereinafter) 1 performs control, management, arithmetic processing, and the like of the respective modules of the image processing apparatus. Direct memory access controller (to be referred to as "DMA" hereinafter) 2 executes high-speed data transfer between external devices and program memory 3, or in program memory 3.

-As the external devices, hard disk drive 16, hard disk controller (HDC) 4 for controlling drive 16, floppy disk drive 17, floppy disk controller (FDC) 5 for controlling drive 17, keyboard 18 used by a user to issue instructions or to input a document to the apparatus of the present invention, mouse 19 as a pointing device for indicating a specific portion of an item displayed on a display screen of display 22, peripheral input/output controller (PIO) 6 for controlling these devices to receive input data, and the like are prepared.

These external devices are connected to peripheral data input/output bus (to be referred to as "PIO bus" hereinafter) 26, so that high-speed data transfer between the external devices and program memory 3 can be performed under the control of CPU 1 and DMA 2 described above.

Figure 3:
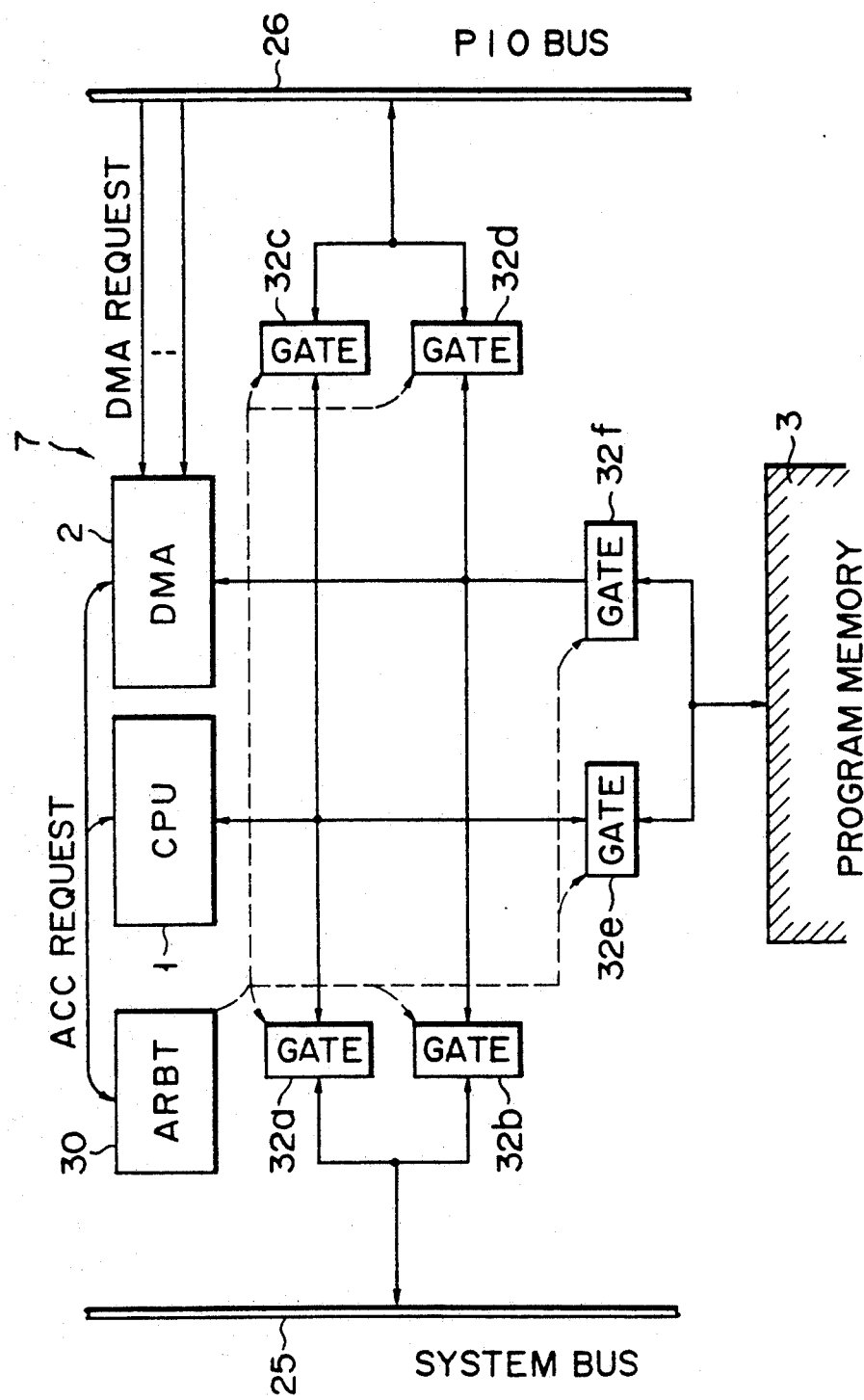

CPU bus logic controller (CBL) 7 can realize the above-mentioned data transfer in other devices and other control portions via system bus 25. CBL 7 controls arbitration of the buses so as to execute parallel data transfer operations to the above portions, and has an arrangement, as shown in, e.g., FIG. 3. More specifically, gates $32a$ to $32f$ are enabled/disabled under the control of bus arbiter (ARBT) 30, thereby connecting between CPU 1, DMA 2, program memory 3, and system bus 25 or PIO bus 26.

An instruction for rotating an image displayed on display 22 can be issued by using mouse 19.

CPU 1 calculates various parameters in correspondence with a rotation angle of an image instructed by mouse 19. For example, CPU 1 calculates X main scanning width XW, main scanning repetition count MN, subscanning repetition count SN, main scanning repetition count SMN of a leading address, subscanning repetition count SSN of the leading address, main scanning X-leading address step count MDX, main scanning Y-leading address step count MDY, subscanning step count SDX used when an X address is updated, subscanning step count SDY used when a Y address is updated, subscanning step count RDX when an X address is not updated subscanning step count RDY used when a Y address is not updated, and the like.

Internal memory $1a$ of CPU 1 stores table data, as shown in FIG. 4. More specifically, memory $1a$ stores, as a table, arithmetic contents for determining parameters corresponding to a rotation angle of an image instructed by mouse 19, i.e., main scanning X address step count MDX, main scanning Y address step count MDY, subscanning step count RDY used when a subscanning X address is updated, subscanning step count RDX used when a subscanning Y address is updated, subscanning step count SDY when the subscanning X address is not updated, subscanning step count SDX used when the subscanning Y address is not updated, and the like.

For example, when a rotation angle is 30° ($0 \leq \theta \leq \pi/4$). "1" is calculated for MDX, "$-\tan\theta$" is calculated for MDY, "$\sin\theta \cdot \cos\theta$" is calculated for SDX, "1" is calculate for SDY, "$\sin\theta \cdot \cos\theta$" is calculated for RDX, and "$1-\tan\theta$" is calculated for RDY.

Communication controller 8 performs protocol control for exchanging data with another external device via communication line 20, data packeting/unpacketing processing, and the like. Data are exchanged with, e.g., program memory 3 under the control of CPU 1 and DMA 2 described above.

Optical disk controller 9 controls optical disk drive 21.

Display controller 10 has a function of reading out display data from a display portion of memory (to be referred to as "DPM" hereinafter) 11 comprising a dual port memory device for storing image data, and sending readout data to display 22 together with a synchronization signal so as to display a portion of DPM 11 on display 22. DPM 11 has not only a function of simply storing image data, but also various drawing functions (to be described in detail later).

Figure 5:
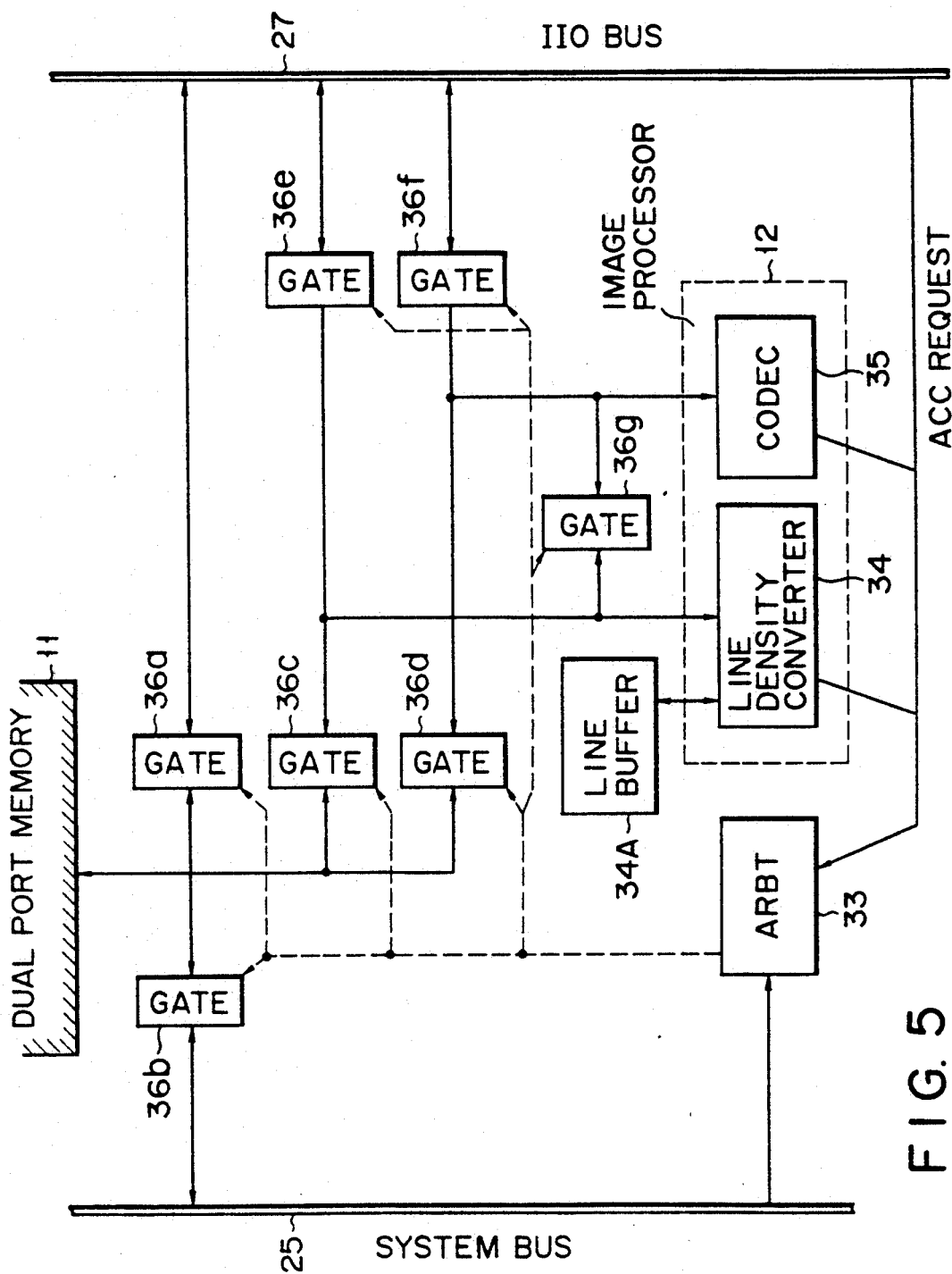

Image processor 12 comprises line density converter (LDC) 34 for performing line density conversion of image data, and coder/decoder (CODEC) 35 for performing image conversion processing such a enlargement/reduction processing of image data, and encoding/decoding processing such as compression/expansion processing of image data, as shown in FIG. 5.

Scanner controller 13 controls image scanner device (to be simply referred to as "scanner" hereinafter) 23 for reading image data from a sheet surface, and inputting the read image data, and performs data transfer to DPM 11. Printer controller 14 loads data from DPM 11, and transfers image data to image printer device (to be simply referred to as "printer" hereinafter) 24 to print out the data on a sheet surface.

Scanner controller 13 and printer controller 14 are connected to image data input/output bus (to be referred to as "IIO bus" hereinafter) 27, and can perform high-speed data transfer with DPM 11.

Image bus logic controller (to be referred to as "IBL" hereinafter) 15 realizes all the data transfer operations associated with image data including data exchange operations with other devices and other control portions performed via system bus 25. IBL 15 controls arbitration of the buses so as to parallelly execute these data transfer operations, and has an arrangement, as shown in, e.g., FIG. 5. More specifically, gates $36a$ to $36g$ are enabled/disable under the control of bus arbiter (ARBT) 33 so as to connect between DPM 11, image processor 12, and system bus 25 or IIO bus 26. Note that the respective units of the above-mentioned control system are systematized as main controller 200.

DPM 11 will be described in detail below with reference to FIG. 6. Memory (bit map memory) 50 is constituted by two portions, i.e., display memory DM and page memory PM, and stores image data, code data, and the like. Display memory DM comprises a dual port memory. Video data is read out from serial port SD of memory DM, and is displayed on display 22. Page memory PM comprises a versatile DRAM (dynamic random-access memory), and can be handled as a one-dimensional memory. Memory 50 has a two-bank architecture, and is divided into even-numbered (EVEN) banks (first access units), and odd-numbered (ODD) banks (second access units).

Figure 7:
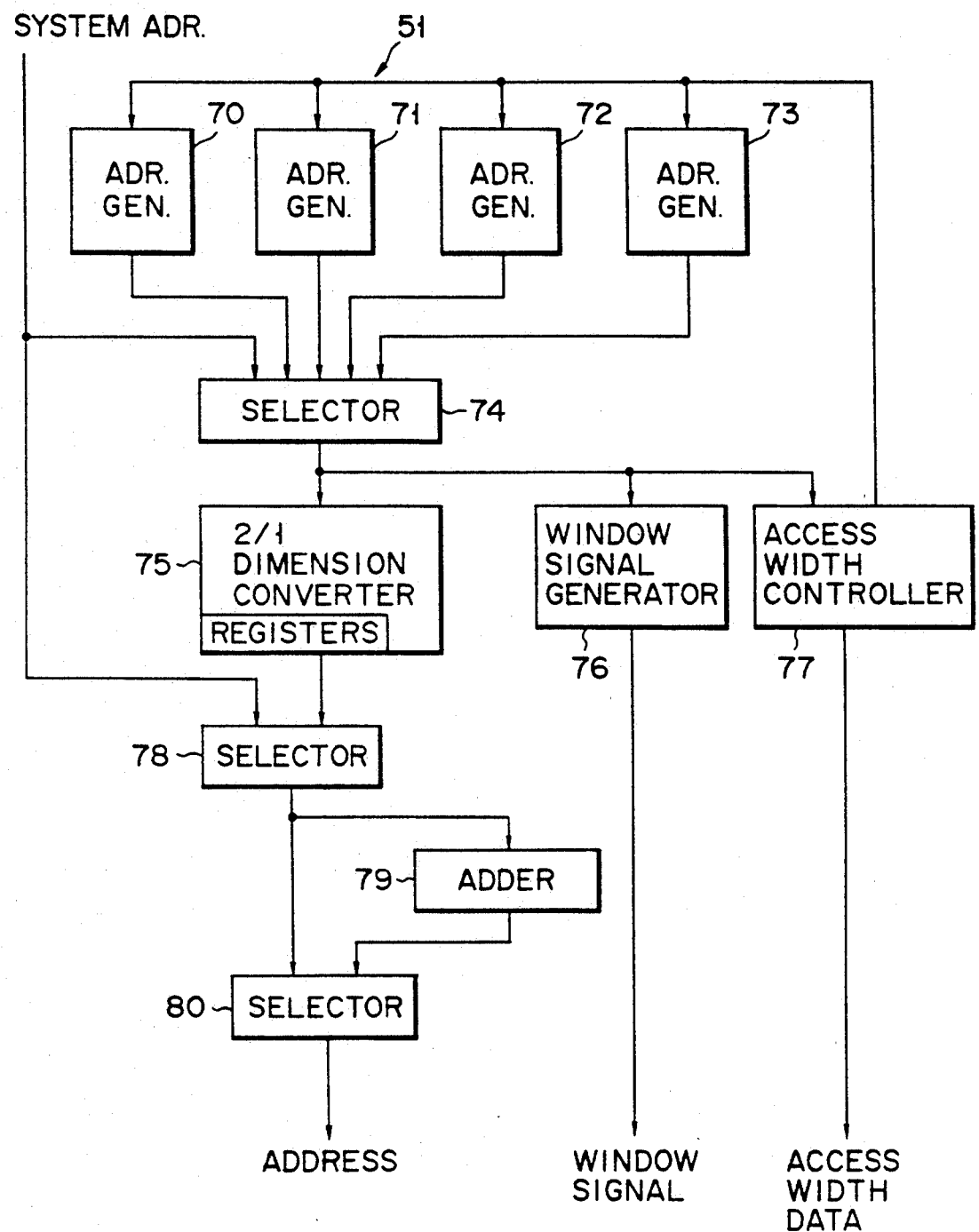

Address generator 51 generates addresses used for accessing memory 50. Address generator 51 comprises four independent address generators 70, 71, 72, and 73, as shown in FIG. 7, and can output an address selected from addresses generated by these address generators, or a system address sent from CPU 1 via system bus 25. Address generators 70, 71, 72, and 73 are respectively two-dimensional address generators, and can generate, e.g., bit addresses for affine transformation. Selector 74 selects one address from the two-dimensional addresses generated by address generators 70, 71, 72, and 73, and the system address. The two-dimensional address selected by selector 74 is supplied to 2/1 dimension converter 75, window signal generator 76, and access width controller 77.

2/1 dimension converter 75 performs processing for converting a two-dimensional address into a one-dimensional address as needed. More specifically, converter 75 calculates the one-dimensional address as follows:

$$XW*YAD+XAD \quad (1)$$

where XAD is the X address, YAD is the Y address, and XW is the X scanning width.

Window signal generator 76 compares the address selected by selector 74 with a preset window address, thereby generating window signals (i.e., a WND signal representing a portion inside a window, an LWND signal representing that the left end of the window is accessed, and an RWND signal representing that the right end of the window is accessed). In this embodiment, two systems of window signals are prepared in correspondence with the respective channels (the banks of memory 50).

Access width controller 77 controls a data width to be accessed on the basis of the generated address.

Selector 78 selects one of an address from 2/1 dimension converter 75, and a one-dimensional system address.

Adder 79 performs an address calculation for supplying the next address to one bank obtained when memory 50 is divided into two banks.

Selector 80 selects one of the present address and the next address of memory 50 calculated by adder 79.

Figure 6:
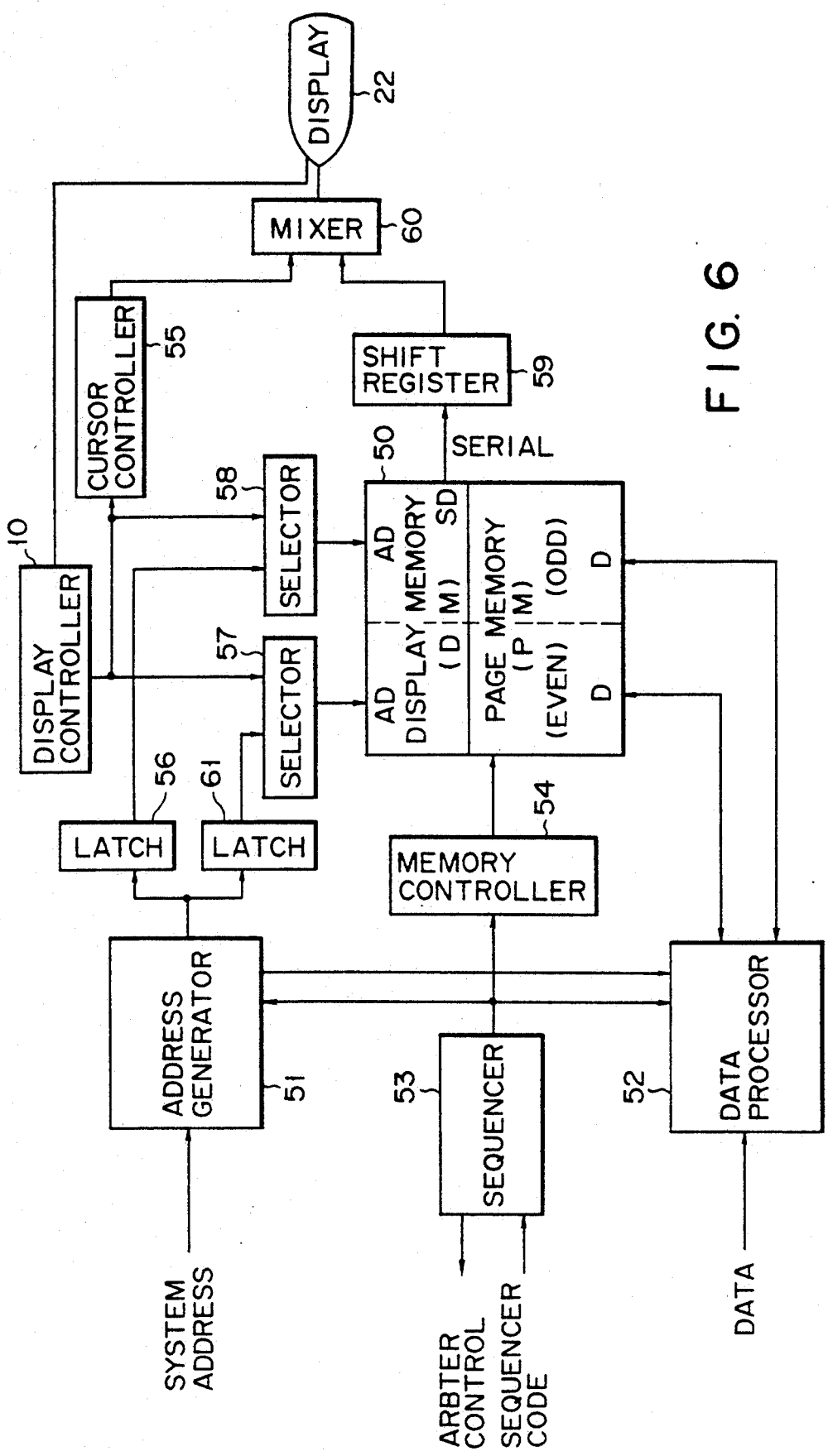

Latches 56 and 61 shown in FIG. 6 respectively store addresses of the ODD and EVEN banks of memory 50 of those from address generator 51.

Data processor 52 has an arrangement, as shown in FIG. 8, and executes data processing such as enlargement, reduction, three-term arithmetic processing, clipping processing, and the like. In this case, processor 52 can perform 1- to 32-bit or 64-bit data processing from an arbitrary bit address. Latch 88 temporarily stores data read out from memory 50. Pattern RAM 86 stores a pattern to be drawn on memory 50. The content of pattern RAM 86 is rewritable.

Data processing unit 85 comprises a register for temporarily storing data, a barrel shifter for shifting data in accordance with an offset address, an enlargement/reduction section for performing enlargement/reduction processing, an inversion processing section for inverting the weight (LSB to MSB) of data, and the like (none of them are shown).

ALU 87 performs a three-term arithmetic operation, i.e., an arithmetic operation among pattern data from pattern RAM 86, source data from data processing unit 85, and destination data from latch 88 which stores data from memory 50.

In the three-term arithmetic operation, mask processor 90 generates a mark for distinguishing a portion which is to be subjected to the arithmetic operation in ALU 87 from a portion which is not subjected to the arithmetic operation. The mask is determined by an off-set address input from address generator 51, window signals, and an access width.

Data processor 52 also comprises boundary detector 89 for supporting a painting function. Boundary detector 89 detects whether or not data input from memory 50 include binary "1" or "0".

Sequencer 53 shown in FIG. 6 has a function of generating a control signal used when address generator 51, data processor 52, and memory controller 54 access a memory. Memory controller 54 generates an RAS signal, a CAS signal, an OE signal, a WE signal, and the like for controlling memory 50.

Display controller 10 shown in FIG. 2 controls display 22, as described above, and a display address output from controller 10 is supplied to selectors 57 and 58 shown in FIG. 6. Selectors 57 and 58 select one of an address from display controller 10, and an address supplied from address generator 51, and the selected address is supplied to memory 50.

The address from display controller 10 is supplied to cursor controller 55, and is compared with preset cursor position data, so that a cursor can be displayed at a proper position of display 22. An HSYNC signal and a VSYNC signal output from display controller 10 are used as synchronization signals in display 22.

Shift register 59 converts display data read out from memory 50 into serial data. Mixer 60 mixes display data supplied from memory 50 via shift register 59, and cursor data supplied from cursor controller 55, and displays mixed data on display 22.

The operations of DPM 11 in the above-mentioned arrangement including operations of peripheral hardware components will be described in detail below.

When memory 50 (FIG. 6) in DPM 1 is to be accessed, an access request (ACC request) is issued to ARBT 33 (FIG. 5) in IBL 15. ARBT 33 performs arbitration to select only one access request when a plurality of access requests contend. When ARBT 33 determines access permission, a sequencer code is supplied to sequencer 53, and sequencer 53 starts its operation, thus controlling, e.g., memory 50.

In this embodiment, four kinds of access modes to DPM 11 are available; that is, an IO access mode as access from scanner 23 and printer 24, a CPU access mode as access from CPU 1, a raster processing access mode when image processing is performed using image processor 12, and an internal access mode as access in DPM 11.

These access modes will be described below. In the IO access mode associated with an image input from scanner 23, CPU 1 sets parameters in the respective associated modules. In this case, one of addresses generated by address generators 70, 71, 72, and 73 of address generator 51 is used as an address to be supplied to memory 50.

When scanner 23 starts its operation, data read by scanner 23 is supplied to scanner controller 13. Scanner controller 13 converts this data to data having a data bus width of IIO bus 27, and issues, to ARBT 33, a data write request to DPM 11. If there are no other access requests, ARBT 33 controls gate 36a to supply the data which is read by scanner 23 and is supplied from scanner controller 13 via IIO bus 27 to DPM 11, and supplies a sequencer code to sequencer 53 at the same time. Thus, sequencer 53 starts data write access to memory 50 in DPM 11.

More specifically, corresponding addresses from address generator 51 are selected while sequentially switching between even and odd addresses, and these even and odd addresses are respectively latched by latches 56 and 61. Selectors 57 and 58 select the addresses from latches 56 and 61, and supply the selected addresses to memory 50.

Meanwhile, data is subjected to data processing in data processor 52, and the processed data is written in memory 50. In this case, a control signal for memory 50 is generated by memory controller 54. Upon completion of data write access, sequencer 53 outputs an arbiter control signal indicating the end of access to ARBT 33, and ARBT 33 outputs an end signal to scanner controller 13, thus ending one data transfer operation.

The above-mentioned operations are repetitively executed to store image data for one frame read by scanner 23 in memory 50, and an input operation is ended.

When image data is output to printer 24 in the IO access mode, CPU 1 sets parameters in the respective associated modules. In this case, one of addresses generated by address generators 70, 71, 72, and 73 of address generator 51 is used as an address to be supplied to memory 50.

When printer 24 starts its operation, printer controller 14 issues a read request of image data from DPM 11 to ARBT 33 via IIO bus 27. If there are no other access requests, ARBT 33 controls gate 36a, and supplies a sequencer code to sequencer 53 at the same time. Thus, sequencer 53 starts a read operation of image data from memory 50.

More specifically, corresponding addresses from address generator 51 are selected while sequentially switching between even and odd addresses, and these even and odd addresses are respectively latched by latches 56 and 61. Selectors 57 and 58 select the addresses from latches 56 and 61, and supply the selected addresses to memory 50.

Meanwhile, a control signal for memory 50 is generated by memory controller 54, and image data is read out from memory 50. Readout image data is subjected to data processing, i.e., shift processing, mask processing, or the like in data processor 52, and is then output onto IIO bus 27 via gate 36a.

Sequencer 53 outputs an arbiter control signal indicating the end of access to ARBT 33, and ARBT 33 outputs an end signal to printer controller 14, thereby informing the end of read access of image data. In this manner, printer controller 14 receives image data, and outputs the received data to printer 24, thus completing one data transfer operation.

The above-mentioned operations are repeated to read out image data for one frame from memory 50, and to out-put readout data to printer 24, thereby ending an output operation to printer 24.

Access to memory 50 by CPU 1 will be explained below.

CPU 1 issues, to ARBT 33 via system bus 25, a read or write access request to memory 50 in DPM 11. If there are no other access request to DPM 11, and the issued request is permitted by the arbiter, ARBT 33 controls gate 36a, and outputs a sequencer code for the CPU access mode to sequencer 53.

In response to this code, sequencer 53 starts access to memory 50. A system address from CPU 1 is input to address generator 51 of DPM 11 via system bus 25. The system address is output via selector 78 or 80 in address generator 51, and is latched by latch 56 or 61. The output from latch 56 or 61 is supplied to memory 50 via selector 57 or 58.

In a read mode, data is read out from memory 50 in accordance with a control signal from memory controller 54, and the readout data is supplied to CPU 1 via data processor 52, gate 36a, and system bus 25.

In a write mode, data from CPU 1 is written in memory 50 via system bus 25, gate 36a, and data processor 52.

The data width of memory 50 is 64 bits, and data processor 52 selects data in accordance with lower bits of an address, thus accessing corresponding data. In the write mode, write control is performed in accordance with a write enable (WE) signal output from memory controller 54.

The raster processing access mode will be described below. In this case, a case will be exemplified wherein image reduction processing is to be executed using image processor 12 (FIG. 5).

CPU 1 sets parameters in the respective modules to be used. In this embodiment, processing for executing reduction processing of image data read out from memory 50 by LDC 34, and writing reduced image data at another address of memory 50 is performed. For this purpose, two of address generators 70, 71, 72, and 73 of address generator 51 are used.

When processing is started, LDC 34 issues a read request of image data from memory 50 to ARBT 33. When ARBT 33 accepts this request, it outputs a sequencer code for external read access to sequencer 53. Thus, image data is read out from memory 50, and is input to LDC 34 via data processor 52 and gate 36a, thus completing a read operation. In this case, an address from a source address generator of the two address generators is used as an address.

The read operation is performed for several lines of an image. Readout image data for several lines are stored in line buffer 34A which is arranged for interpolation processing executed by LDC 34. When data in a proper volume are stored in line buffer 34A, LDC 34 issues a write request to ARBT 33.

ARBT 33 outputs a sequencer code for external write access to sequencer 53, thereby starting a write operation. More specifically, a destination address generator of address generator 51 is selected, and reduced image data output from LDC 34 are written in memory 50 via gate 36a and data processor 52. When the above-mentioned processing is performed for one image, an operation is ended.

The internal access mode in DPM 11 will be described below.

The internal access mode includes a plurality of kinds of access modes. More specifically, the internal access mode includes a copy access mode for copying data to another address, a swap access mode for swapping data, and a drawing access mode for drawing, e.g., a pattern. These access modes are controlled by sequencer 53 (FIG. 6) in DPM 11. An address at this time is obtained from address generator 51, and in the copy and swap access modes, two of address generators 70, 71, 72, and 73 are used.

When the access mode is set in an internal sequencer in sequencer 53, an internal access request is issued to ARBT 33. When ARBT 33 accepts the internal access request, it supplies a sequencer code to sequencer 53. Sequencer 53 accesses memory 50 using an address from address generator 51, and causes data processor 52 to process data.

Address generator 51 can generate not only addresses of a simple rectangular region, but also affine transformation addresses for rotation, trapezoid addresses, and the like, and copy access using these addresses can be performed.

Figure 9:
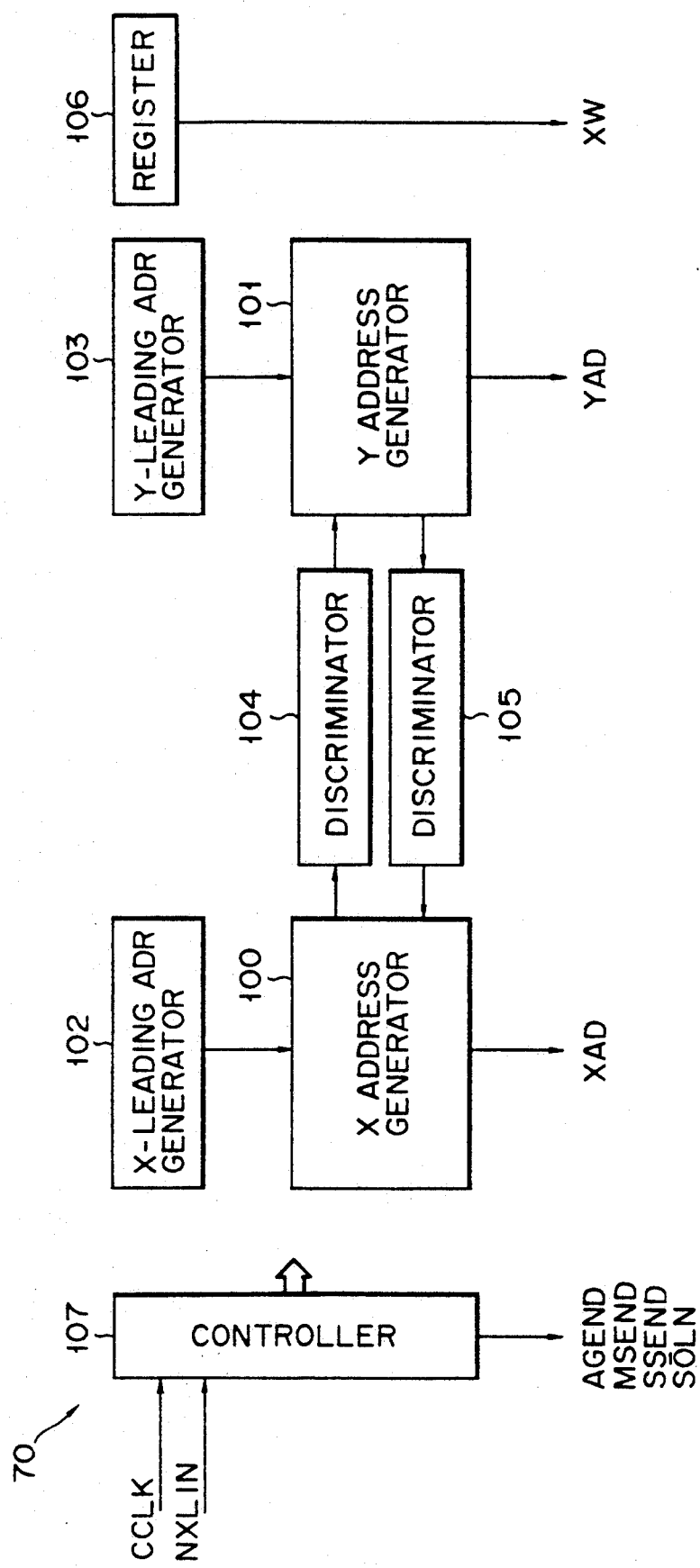

FIG. 9 is a block diagram showing one of address generators (AGs) 70, 71, 72, and 73 in address generator 51 shown in FIG. 7.

Each of address generators 70 to 73 is a block for generating two-dimensional addresses (X-Y plane), and comprises X address generator 100 for generating an X address, Y address generator 101 for generating a Y address, X-leading address generator 102 for generating an X-leading address, Y-leading address generator 103 for generating a Y-leading address, discriminator 104 for discriminating whether or not an X address is changed upon generation of high-quality affine transformation addresses, discriminator 105 for discriminating whether or not a Y address is changed upon generation of high-quality affine transformation addresses, scanning width register 106 for designating X scanning width XW, and controller 107 for controlling, e.g., an address calculation in accordance with a clock (CCLK).

X address generator 100 will be described in detail below with reference to FIG. 10.

Each of address generators 100 and 101 is a block for generating a one-dimensional address. X address generator 100 comprises MDX register 110 for designating a main scanning step count, adder 113 for performing an addition with X address XAD, register 114 for temporarily storing the sum from adder 113, SDX register 112 for designating a subscanning step count, RDX register 111 for designating a subscanning step count used in a high-quality affine transformation mode, selector 116 for selecting a subscanning step count in accordance with a result of discriminator 105 in the high-quality affine transformation mode, adder 117 for sequentially calculating a subscanning address, register 118 for temporarily storing the address output from adder 117, selector 119 for selecting one of a leading address generated by X-leading address generator 102, and the subscanning address, and selector 115 for selecting one of the address selected by selector 119 and a main scanning address, and outputting an X address. Y address generator 101 has the same arrangement as described above.

A decimal part of each of parameters MDX, RDX, and SDX is expressed by 16 bits, and an integral part thereof is also expressed by 16 bits (including a code bit). These parameters are set by CPU 1 described above.

Figure 10:
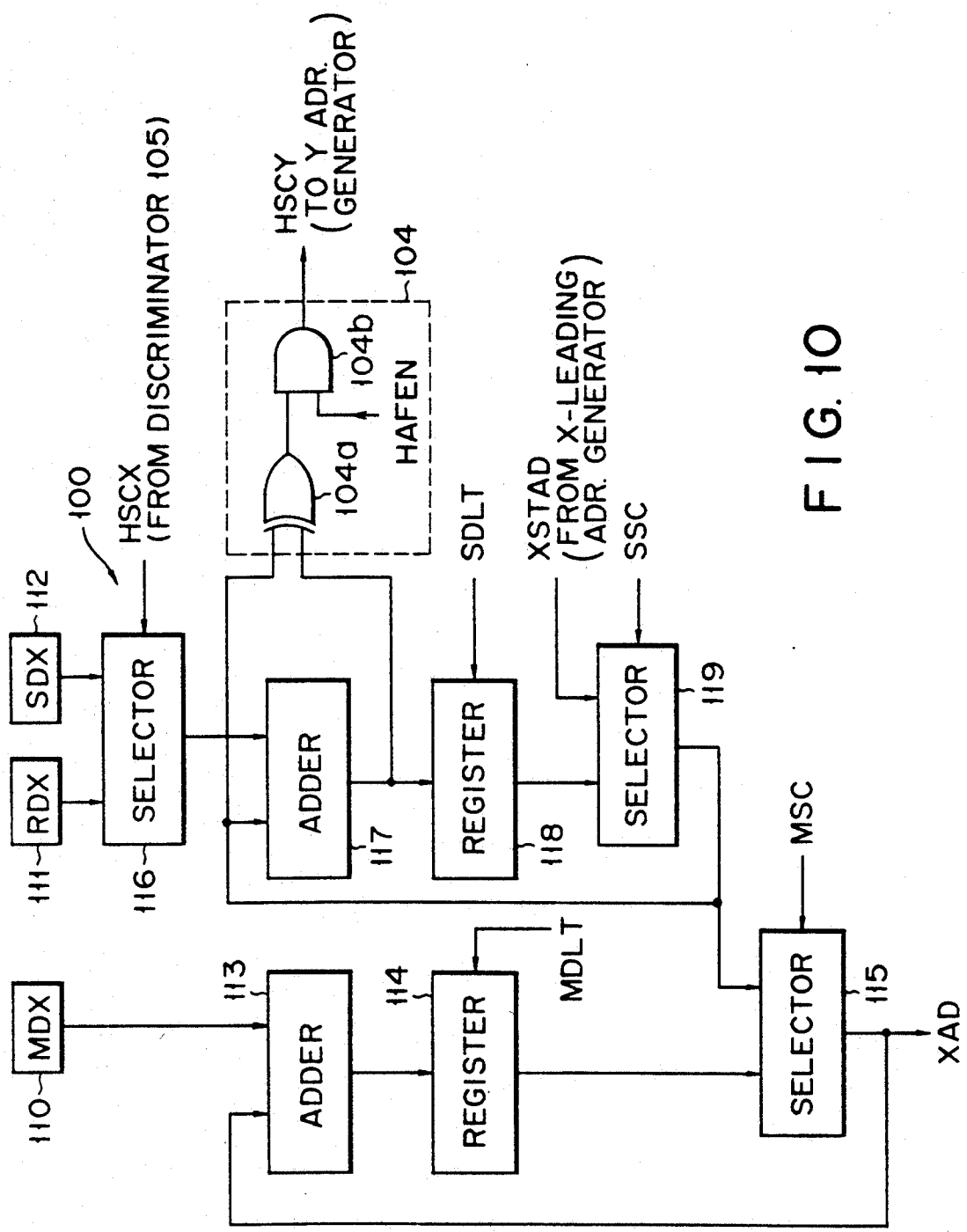

In FIG. 10, discriminator 104 for discriminating a change in X address comprises EOR circuit 104a for discriminating whether or not the first bit of the integral part of a subscanning address is changed, and mask circuit 104b for masking the output from EOR circuit 104a by high-quality affine transformation mode enable signal HAFEN. Note that FIG. 10 is a block diagram showing X address generator 100 and discriminator 104. Y address generator 101 and discriminator 105 also comprise the same circuit arrangements, and signal names can be read by replacing X with Y.

Figure 11:
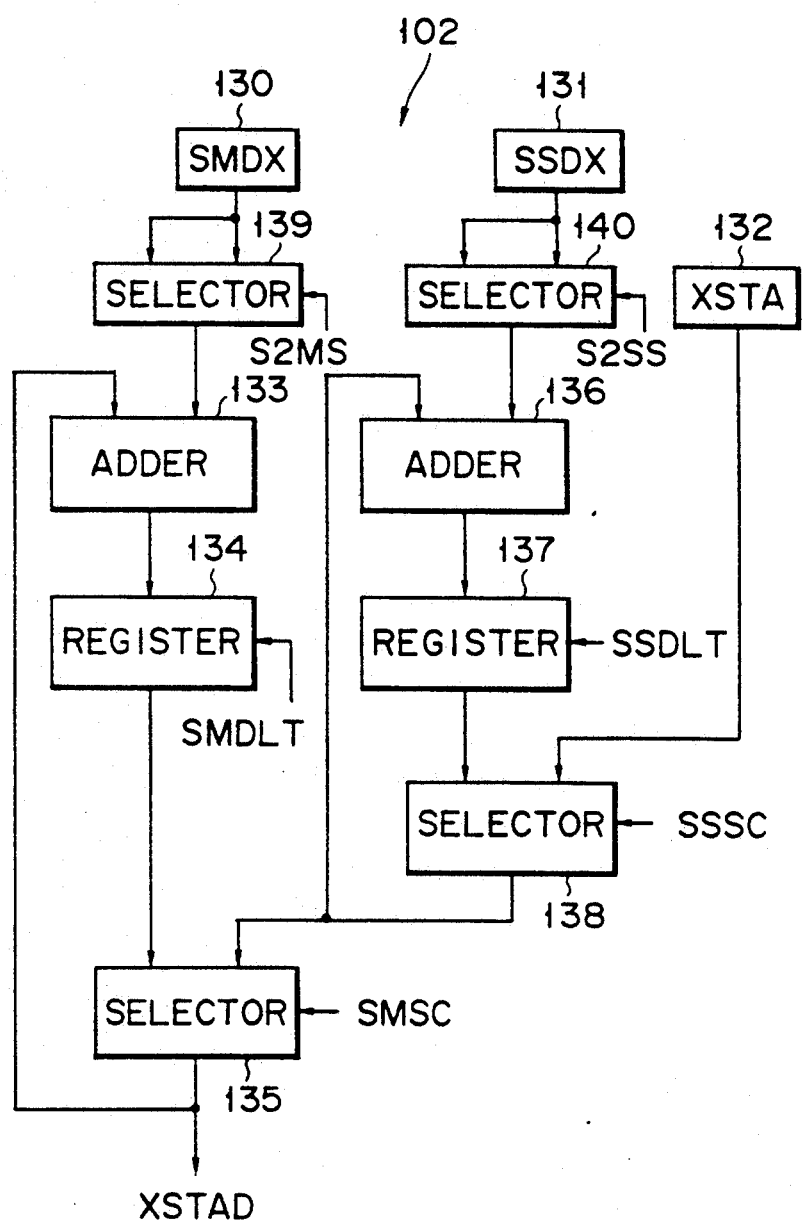

X-leading address generator 102 for generating a X-leading address will be described below with reference to FIG. 11. Since X-leading address generator 102 has the same arrangement as that of Y-leading address generator 103, a description of Y-leading address generator 103 will be omitted.

X-leading address generator 102 comprises XSTA register 132 for designating a first leading address, SMDX register 130 for designating a step count of a main scanning leading address, selector 139 for selecting one of the value of SMDX register 130, and a value ½ the value of register 130, adder 133 for calculating a main scanning leading address, register 134 for temporarily storing the main scanning leading address, SSDX register 131 for designating a step count of a subscanning leading address, selector 140 for selecting one of the value of SSDX register 131, and a value ½ the value of register 131, adder 136 for calculating a subscanning leading address, register 137 for temporarily storing the subscanning leading address, selector 138 for selecting one of the subscanning leading address and first leading address XSTA, and selector 135 for selecting one of the subscanning leading address, and the main scanning leading address, and outputting leading address XSTAD. The integral part of each parameter (SMDX, SSDX) is expressed by 16 bits (including a code bit), and the decimal part thereof is also expressed by 16 bits. The parameters are set by CPU 1 described above.

Controller 107 will be described below with reference to FIG. 12. Controller 107 is a block for generating control signals for the respective circuits in accordance with a command, a mode, and a clock. Controller 107 comprises command register 151 for designating, e.g., start of address calculations in the address generators, mode register 152 for designating an operation mode, MN register 153 for designating a main scanning repetition count, counter 157 for loading the designated count, and counting the loaded value in accordance with a clock, SN register 154 for designating a subscanning repetition count, counter 158 for loading the designated count, and counting the loaded value in accordance with a clock, SMN register 155 for designating a main scanning repetition count of a leading address, counter 159 for loading the designated count, and counting the loaded value in accordance with a clock, SSN register 156 for designating a subscanning repetition count of the leading address, counter 160 for loading the designated count, and counting the loaded value in accordance with a clock, and controller 150 for generating control signals. The parameters (MN, SN, SMN, and SSN) are set in register 153, and the like by CPU 1 described above.

FIGS. 13A and 13B show meanings of parameters when normal two-dimensional addresses are generated. More specifically, if a leading address in X main scanning width XW is represented by (XSTA, YSTA), the next address is represented by (XSTA+MDX, YSTA+MDY) obtained by adding the X- and Y-addresses to main scanning step counts. The address addition is sequentially repeated by main scanning repetition count MN. Therefore, the main scanning end address is expressed by (XSTA+MDX*MN, YSTA+MDY*MN).

Upon completion of generation of addresses for one main scanning line, a subscanning address is calculated. More specifically, an address (XSTA+SDX, YSTA+SDY) is calculated. The next address is expressed by (XSTA+SDX+MDX, YSTA+SDY+MDY).

Formulas for a two-dimensional address to be generated are expressed by:

$$XAD = XSTA + MDX*mn + SDX*sn \quad (2)$$

$$YAD = YSTA + MDY*mn + SDY*sn \quad (3)$$

where mn and sn are respectively the main scanning and subscanning count values. In this case, these count values respectively satisfy $0 \leq mn \leq MN$, and $0 \leq sn \leq SN$.

Figure 14B:
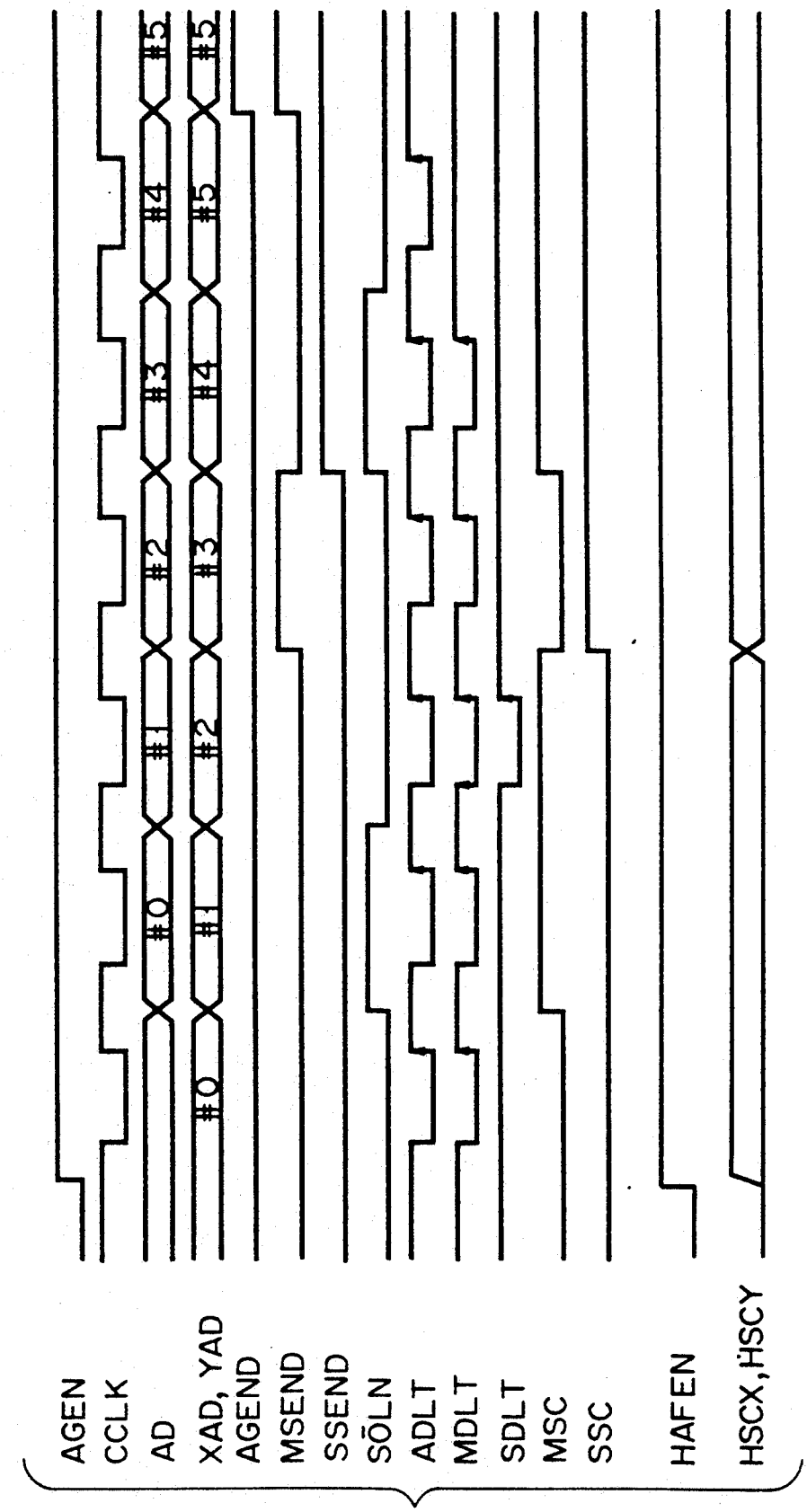
FIGS. 14B and 14D are timing charts showing respective signals in FIG. 12.
Figure 14D:
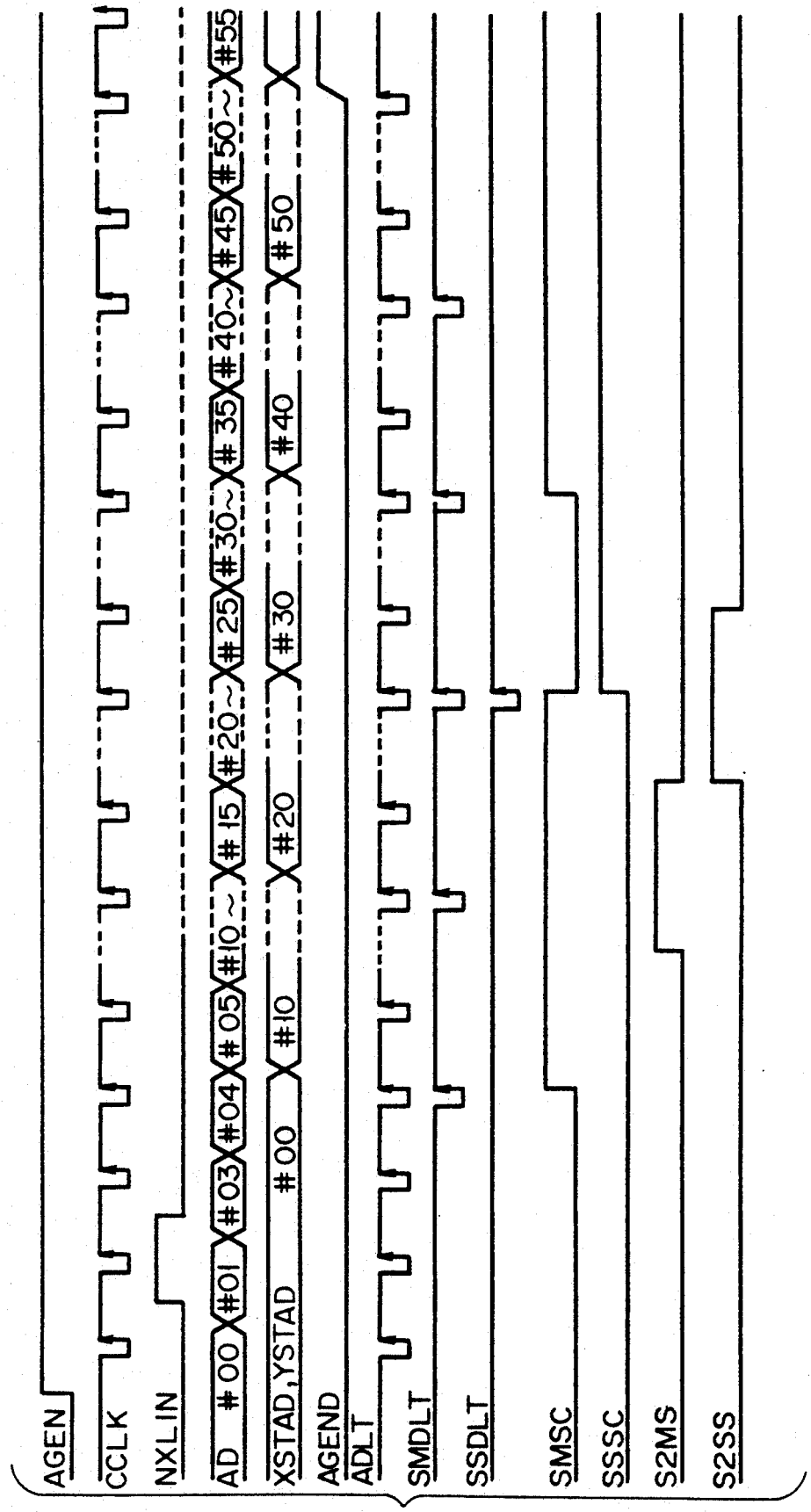

An operation for generating normal two-dimensional addresses will be described below with reference to FIGS. 14A, 14B, 14C, and 14D. FIG. 14A exemplifies a case wherein 6 addresses #0 to #5 are generated, and FIG. 14C exemplifies a case wherein 6 addresses #00 to #50 are generated. FIGS. 14B and 14D show signals input to or output from controller 150 shown in FIG. 12.

First, parameters are set. In this state, address #0 as the leading address is expressed by XSTA and YSTA, a main scanning width is XW, main scanning step counts are MDX and MDY, subscanning step counts are SDX and SDY, main scanning repetition count MN is 2, and subscanning repetition count SN is 1.

Figure 12:
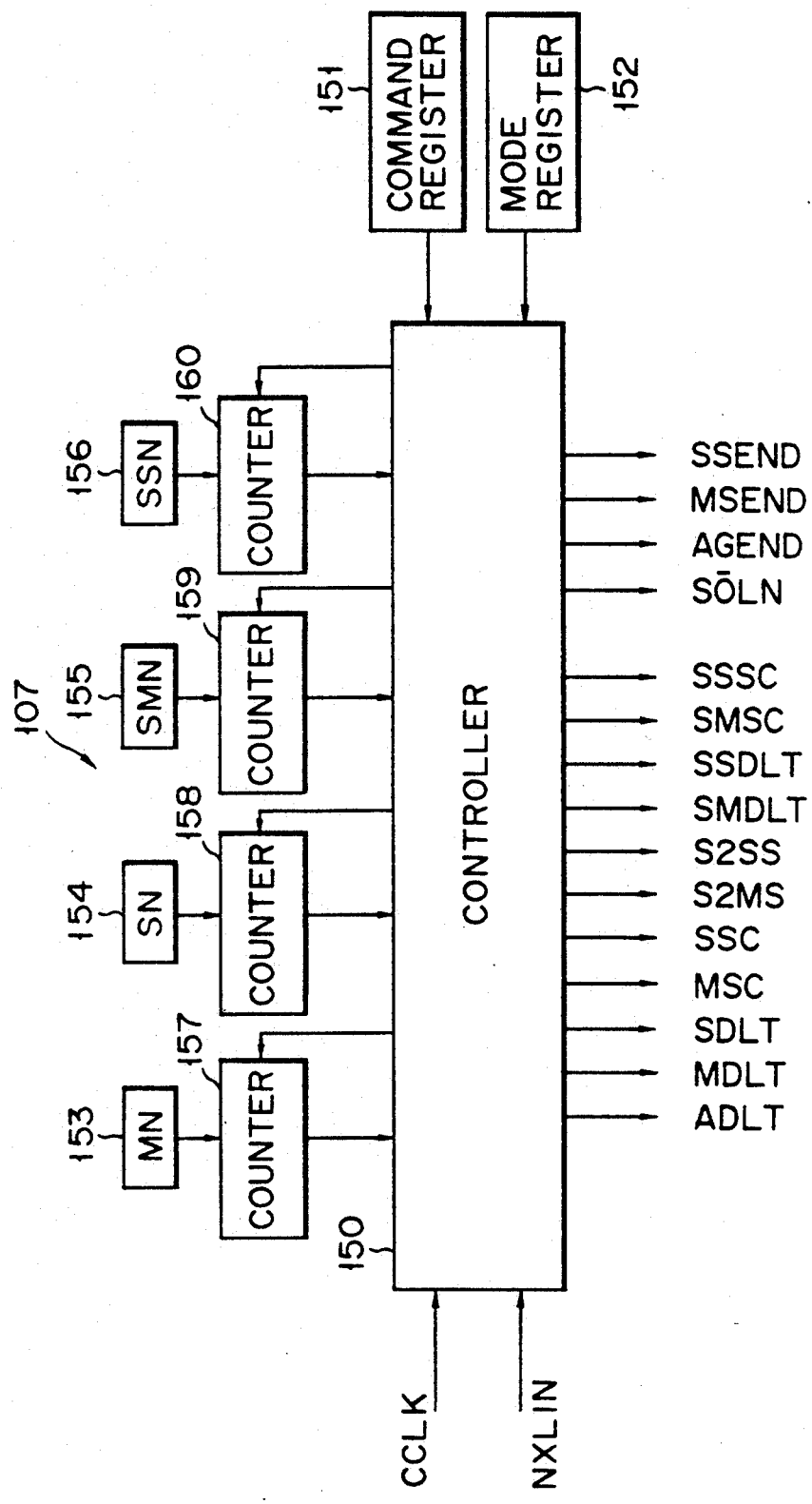

Mode register 152 in FIG. 12 is set in a normal mode, and command register 151 is caused to enable address generation signal bit AGEN, thereby inputting one clock CCLK to controller 150.

In this case, although the leading address is calculated, since the normal mode is selected, both select signals SMSC and SSSC for selectors 135 and 138 (FIG. 11) are set at "L" level. Thus, the leading address components XSTAD=XSTA and YSTAD=YSTA are respectively input to X and Y address generators 100 and 101.

In FIG. 14D, note that the third address (#3) of signal AD is set at the leading head of the next line of the first address (#1). Signal S2MS should be established at the input timing of signal SMLDT, and signal S2SS should be established at the input timing of signal SSLDT. When signal S2MS is enabled, the step number of the start address for the main scanning direction is half of the content of signal SMDX. Similarly, when signal S2SS is enabled, the step number of the start address for the subscanning direction is half of the content of signal SSDX.

Address generators 100 and 101 generate two-dimensional address components XAD=XSTA and YAD=YSTA since both select signals MSC and SSC for selectors 115 and 119 are at "L" level.

2/1 dimension converter 75 then performs the following calculation:

$$AD = YAD*XW + XAD \quad (4)$$

The calculation result is latched by the internal register of 2/1 dimension converter 75 in response to signal ADLT generated in synchronism with clock CCLK, and the latched result is then output. The generation sequence of address #0 has been described.

At the same time, the sum XAD=XSTA+MDX obtained by adding XAD=XSTA to the content of MDX register 110 by adder 113 in accordance with signal MDLT is latched by next register 114. More specifically, a pipeline arrangement is employed between registers 114 and 118 (FIG. 10) in address generators 100 and 101, and the internal register of 2/1 dimension converter 75.

On the other hand, in controller 107, the contents of MN and SN registers 153 and 154 are respectively loaded to counters 157 and 158, and the loaded values are counted down. As a result of counting down, the contents of counters 157 and 158 respectively become 1 and 0. Select signal MSC for selector 115 goes to "H" level since the calculation of the leading address is completed, and the content of register 114 is output as XAD.

When next clock CCLK is input to controller 150 shown in FIG. 12, register 114 has already latched next address #1 (FIG. 14A). For this reason, address AD (FIG. 14B) is calculated on the basis of the latched address components XAD=XSTA+MDX and YAD=YSTA+MDY, and is latched in response to signal ADLT.

At the same time, address #2 is calculated by adder 113, and is latched by register 114. More specifically, XAD=XSTA+MDX*2, and YAD=YSTA+MDY*2. At this time, the content of counter 157 becomes "0".

When next clock CCLK is input to controller 150, latch clocks ADLT, MDLT, and SDLT are enabled. Address #2 is output in response to clock ADLT. At the same time, the value YSTA+SDX is latched by register 118, and since signal SSC goes to "H" level and signal MSC goes to "L" level, the content of register 118 becomes XAD. In this manner, various signals are generated by controller 107 at timings shown in FIG. 14B, and addresses #0 to #5 are generated.

The flow of processing for generating rotated addresses according to the present invention will be described in detail below. A rotated address generation method which is free from pixel omission, and does not require accessing the same pixel a plurality of times will be explained below.

In order to generate a line in an arbitrary direction, the Bresenham's line generation algorithm is used. More specifically, if X and Y distances between start and end points of a line are respectively represented by dx and dy, if $dy/dx \leq 1$, an X coordinate is incremented in unitary increments, and a Y coordinate is added to an increment when the X coordinate is incremented by one, thus generating a line. If $dy/dx \geq 1$, a Y coordinate is incremented in unitary increments, and an X coordinate is added to an increment when the Y coordinate is incremented by one, thus generating a line. In this case, coordinates may be decremented in place of being incremented depending on a generation direction of a line. More specifically, if the X direction is the negative direction, the X coordinate is decremented, and if the Y direction is the negative direction, the Y coordinate is decremented.

Figure 15:
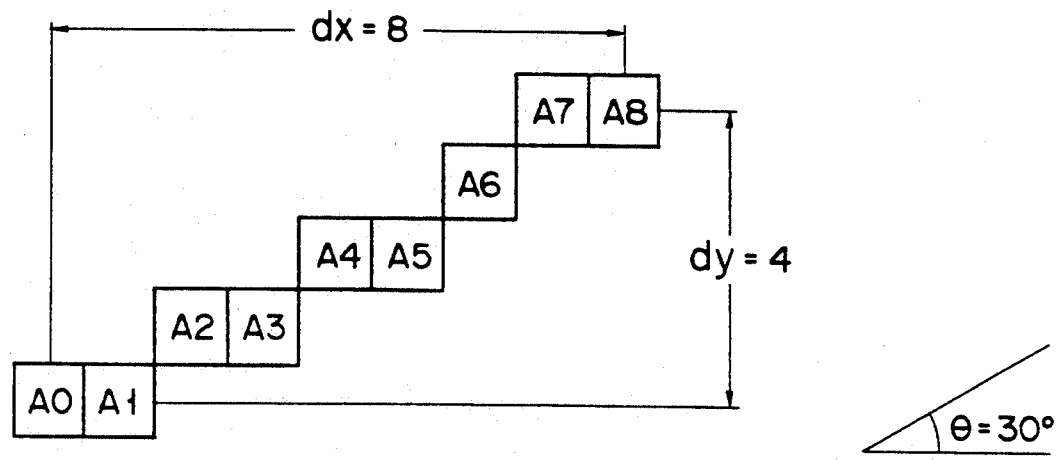
Figure 16:
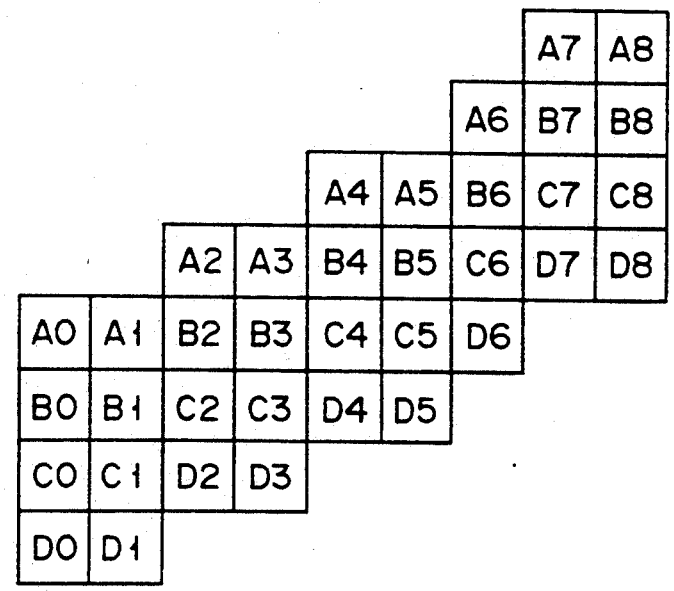

For example, FIG. 15 exemplifies a case wherein a line having an inclination of 30° is generated. In this embodiment, MDX=1, and MDY=−tan30 are set to generate this line. If dy/dx≦1, an address for only one pixel is generated as an X address. Therefore, when this line is translated in the Y direction, addresses free from gaps can be generated, as shown in FIG. 16.

Therefore, in order to generate addresses for a rotated figure free from gaps, the above line generation algorithm is used in the main scanning direction, and subscanning addresses (i.e., start points of respective lines) can be generated in accordance with a angle. Subscanning address generation will be explained below. A case will be exemplified below wherein a rotation angle=30°. In this case, a Y subscanning address is incremented in unitary increments to generate line addresses like in FIG. 15.

If a Y distance in this case is represented by dys, an X coordinate can be calculated by:

$$INT(dys*\sin 30*\cos 30) \quad (5)$$

Figure 17:
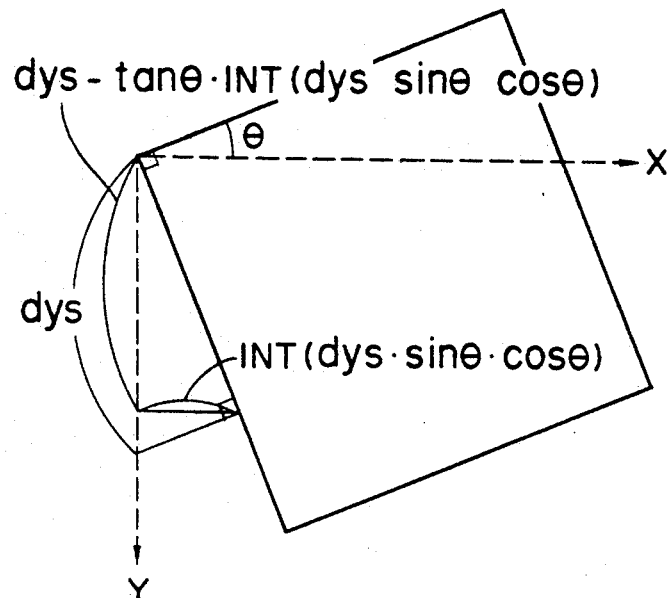

Therefore, the Y coordinate can be calculated as follows (FIG. 17):

$$dys + MDY*INT(dys*\sin 30*\cos 30) \quad (6)$$

where $INT(dys*\sin 30*\cos 30)$ represents the maximum integer which does not exceed a value in parentheses.

Figure 18:
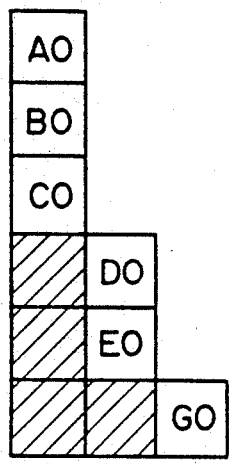

In this manner, a subscanning address (i.e., the leading address of the next line) can be generated by formulas (5) and (6). FIG. 18 shows subscanning address generation for 30° rotation.

If formulas (5) and (6) are directly processed by hardware components, a hardware scale becomes considerable. Therefore, according to the present invention, calculations of formulas (5) and (6) are attained by only additions. More specifically, in this embodiment, register 118 holds the immediately preceding subscanning address, and X and Y change amounts can be added to the held address. Therefore, X subscanning address XADS can be calculated by:

$$XADS(N) = XADS(n-1) + SDX \quad (7)$$

If INT(XADS) remains the same (i.e., XADS is not changed), Y subscanning address YADS can be calculated by:

$$YADS(N) = YADS(n-1) + SDY \quad (8)$$

If INT(XADS) is incremented by one (i.e., XADS is changed), address YADS can be calculated by:

$$YADS(n) = YADS(n-1) + SDY + MDY \quad (9)$$

If RDY = SDY + MDY, when XADS is changed, address YADS can be calculated by YADS(n-)=YADS(n-1)+RDY. Therefore, in 30° rotation, whether SDY or RDY is added to immediately preceding Y subscanning address YADS(n-1) can be controlled depending on whether or not XADS is changed. FIG. 18 shows generated addresses in 30° rotation.

The operations of hardware components in this embodiment will be described below. In this case, 30° rotation will be exemplified.

The following parameters are set: address components XSTA and YSTA as leading address A0; main scanning width XW; main scanning step counts MDX=1 and MDY=−tan30; subscanning step counts SDX=sin30*cos30, and SDY=1; main scanning repetition count MN=8; subscanning repetition count SN=5; and high-quality affine transformation subscanning step counts RDX=SDX=sin30*cos30, and RDY=1+MDY=1−tan30.

Mode register 15 is then set in the high-quality affine transformation mode, and enable signal HAFEN is enabled. Command register 151 is caused to enable address generation enable signal bit AGEN, and one clock CCLK is input to controller 150. In this case, although the leading address is calculated, since the normal mode is selected, both select signals SMSC and SSSC for selectors 135 and 138 (FIG. 11) are set at "L" level. Thus, the leading address components XSTAD=XSTA and YSTAD=YSTA are respectively input to X and Y address generators 100 and 101. Address generators 100 and 101 generate two-dimensional address components XAD=XSTA and YAD=YSTA since both select signals MSC and SSC for selectors 115 and 119 are at "L" level.

2/1 dimension converter 75 then calculates AD=YAD*XW+XAD (formula (4)). The calculation result is latched by the internal register of 2/1 dimension converter 75 in response to signal ADLT generated in synchronism with clock CCLK, and the latched result is then output. The generation sequence of address A0 has been described.

At the same time, the next address obtained by adding the content of register MDX 110 to XAD =XSTA by adder 113 in accordance with signal MDLT is latched by register 114, thus yielding XAD =XSTA +MDX. On the other hand, in controller 107, the contents of MN and SN registers 153 and 154 are respectively loaded to counters 157 and 158, and the loaded values are counted down. As a result of counting down, the contents of counters 157 and 158 respectively become 7 and 4. Select signal MSC for selector 115 goes to "H" level since the calculation of the leading address is completed, and the content of register 114 is output as XAD.

Register 114 has already latched next address A1. For this reason, when next clock CCLK is input to controller 150, address AD is calculated on the basis of the latched address components XAD=XSTA+MDX and YAD=YSTA+MDY, and is latched by the internal register of converter 75 in response to signal ADLT.

At the same time, address A2 is calculated by adder 113, and is latched by register 114. More specifically, XAD=XSTA+MDX*2, and YAD=YSTA+MDY*2. At this time, the content of counter 157 becomes "6".

These operations are repeated. When clock CCLK is input after the content of counter 157 becomes "0", latch clocks ADLT, MDLT, and SDLT are enabled. Address A8 in FIG. 16 is output in response to clock ADLT. At the same time, address B0 is calculated, and latched by register 118. In this case, in 30° rotation, the X subscanning step count does not depend on the result of discriminator 105, and is set to be RDX=SDX to add SDX to the leading address of the immediately preceding line.

In this embodiment, parameters are set to have RDX=SDX, so that even when selector 116 is switched in response to signal HSCX, the output from selector 116 remains the same. However, discriminator 105 may be disabled to set signal HSCX at "L" level.

Figure 19:
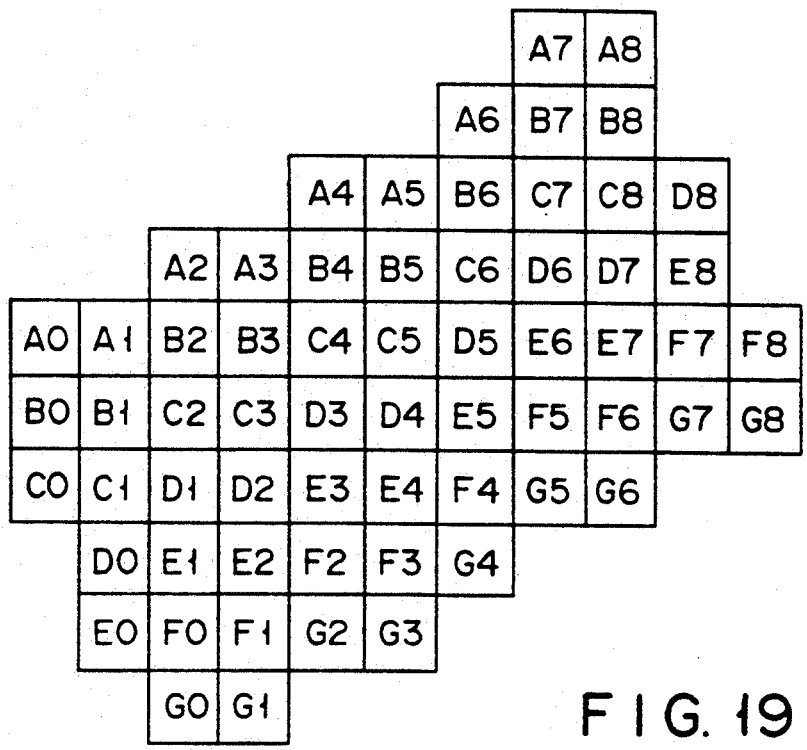

In address calculation of address B0, the first bit of the integral part is not changed even when SDX is added to the X address component of address A0. For this reason, signal HSCY output from discriminator 104 goes to "L" level, and SDY is used for calculating the Y address component of address B0. Then, addresses B0 to B8 are generated in the main scanning direction. When the above-mentioned operations are repeated, signal HSCY from discriminator 104 goes to "H" level upon address calculation of address D0, RDY is selected by selector 116 (Y) in Y address generator 101, RDY is added to the Y address component of address C0 by adder 117 (Y), and the sum is latched by register 118 (Y) in response to clock SDLT. Upon repetition of the above operation, 30°-rotated figure addresses shown in FIG. 19 can be generated.

In this embodiment, 30° rotation has been exemplified. For other angles, values of parameters are obtained using the storage table shown in FIG. 4, and are set, so that rotated addresses at arbitrary angles can be generated a high speed.

FIG. 20 is a flow chart showing a sequence for generating rotated addresses free from pixel omission. FIG. 21 shows 30°-rotated addresses generated by the sequence shown in FIG. 20. The sequence shown in FIG. 20 is executed by CPU 1 shown in FIG. 2.

First, parameters are initialized. More specifically, main scanning address parameter mn is initialized to 0, subscanning address parameter sn is initialized to 0, main scanning addresses XADM (mn=0) and YADM (mn=0) are respectively initialized to 0, and subscanning addresses XADS (sn=0) and YADS (sn=0) are respectively initialized to XSTA and YSTA (ST10).

If X and Y addresses of an objective pixel are respectively represented by XAD(sn,mn) and YAD(sn,mn), XAD(sn,mn)=XADS(sn)+XADM(mn), and YAD(sn,mn)=YADS(sn)+YADM(mn) are set (ST12). If the end address components of a rotated pattern are represented by MN (main scanning direction) and SN (subscanning direction), $0 \leq mn \leq MN$, and $0 \leq sn \leq SN$. As parameters such as MDX, MDY, and the like, those shown in the table in FIG. 4 are used.

If the main scanning address of the objective pixel is not the end address (NO in ST14), parameter mn is incremented by one (ST16). Thereafter, XADM(mn) and YADM(mn) are respectively set to be XADM(mn−1)+MDX and YADM(mn−1)+MDY (ST18), and the flow return to step ST12.

If the main scanning address of the objective pixel is the end address (YES in ST14), but its subscanning address is not the end address (NO in ST20), parameter sn is incremented by one (ST22), and XADS(sn) is set to be XADS(sn−1)+SDX (ST24).

When "INT( )" is defined as an integer in the parentheses, if INT(XADS(sn))≠INT(XADS(sn−1)) (NO in ST26), signal HSCY goes to "H" level, and YADS(sn) is set to be YADS(sn−1)+RDY (ST28). If INT(XADS(sn))=INT(XADS(sn−1)) (YS in ST26), signal HSCY goes to "L" level, and YADS(sn) is set to be YADS(sn−1)+SDY (ST30). Thereafter, parameter mn is reset to 0 (ST32), the flow returns to step ST12.

If the main scanning address of the objective pixel is the end address (YES in ST14), and its subscanning address is also the end address (YES in ST20), software address calculation processing in FIG. 20 is ended. If the main and subscanning end addresses are represented by (SN=4, MN=3), rotated addresses obtained by the processing shown in FIG. 20 in FIG. 21.

As described above, rotated addresses at an arbitrary angle can be generated at high speed by a simple circuit without causing pixel omission, and without accessing the same address a plurality of times. Thus, a high-quality rotated figure which allows interpixel arithmetic operations can be drawn.

As described in detail above, according to the present invention, an image processing apparatus which can generate high-quality rotated addresses without causing omission of pixels in a rotated figure area, and without accessing the same pixel a plurality of times, and can perform inter-pixel arithmetic operations when rotated addresses at an arbitrary angle are to be generated, can be provided.

Additional advantages and modifications will readily occur to those skilled in the art. Therefore, the invention in its broader aspects is not limited to the specific details, and representative devices, shown and described herein. Accordingly, various modifications may be without departing from the spirit or scope of the general inventive concept as defined by the appended claims and their equivalents.

What is claimed is:

1. An image processing apparatus which comprises an address generation mechanism for designating a position on a bit map memory by generating rectangular region addresses on a two-dimensional plane having X and Y axes, comprising:

means for developing bit map data representing a predetermined two-dimensional pattern in a region defined by the rectangular region addresses on the bit map memory using main scanning and subscanning addresses;

means for designating a rotation angle of the two-dimensional pattern developed on the bit map memory;

means, on the basis of the designated rotation angle, a repetition count of the main scanning addresses, and a repetition count of the subscanning addresses, for determining:

a first step count of a change in main scanning leading address in the X-axis direction, a second step count of a change in main scanning leading address in the Y-axis direction, a third step count of a change in subscanning address when the address in the X-axis direction is changed, a fourth step count of a change in subscanning address when the address in the Y-axis direction is changed, a fifth step count of a change in subscanning address when the address in the X-axis direction remains unchanged, and a sixth step count of a change in subscanning address when the address in the Y-axis direction remains unchanged;

means for calculating the main scanning and subscanning addresses on the basis of the repetition count of the main scanning addresses, the repetition count of the subscanning addresses, and one of the first, second, third, fourth, fifth, and sixth step counts;

means for generating a one-dimensional address in the X-axis direction, and a one-dimensional address in the Y-axis direction;

means for converting a two-dimensional address defined by the one-dimensional addresses in the X- and Y-axis directions into a one-dimensional address; and means for reading out an image pattern developed on the bit map memory using the converted one-dimensional address.

2. An apparatus according to claim 1, further comprising detection means for detecting whether or not the subscanning addresses in the X- and Y-axis directions are changed.

3. An apparatus according to claim 2, wherein said calculating means includes means for, when said detecting means detects the change in address, using the third step count in the subscanning address calculation.

4. An apparatus according to claim 2, wherein said calculating means includes means for, when said detecting means does not detect the change in address, using the fifth step count in the subscanning address calculation.

5. An apparatus according to claim 1, wherein said determining means includes means for converting the two-dimensional pattern into a pattern rotated by the designated angle on the basis of the designated rotation angle and the first, second, fourth, fifth, and sixth step counts.

6. An apparatus according to claim 1, further comprising means for providing a leading address of the two-dimensional pattern.

7. An address generation apparatus for generating rectangular region addresses on an X-Y two-dimensional plane on a bit map memory, and designating a storage position of the bit map memory, comprising:

means for developing bit map data representing a predetermined two-dimensional pattern in a region defined by the rectangular region addresses on the bit map memory using main scanning and subscanning addresses;

means for generating a one-dimensional address in the X-axis direction, and a one-dimensional address in the Y-axis direction;

means for discriminating whether or not the subscanning addresses in the X-axis and Y-axis directions generated by said address generation means are changed;

means for converting a two-dimensional address defined by the one-dimensional addresses in the X- and Y-axis directions into a one-dimensional address; and means for reading out an image pattern developed on the bit map memory using the converted one-dimensional address.

8. An apparatus according to claim 7, wherein said generating means comprises a main scanning address generator for generating main scanning addresses, and a subscanning address generator for generating subscanning addresses, said subscanning address generator including first and second registers for storing subscanning change amounts, a selector for selecting the subscanning change amount from one of said first and second registers in accordance with a discrimination result obtained by said discriminating means, a subscanning address register for temporarily storing the subscanning address, and an adder for adding the subscanning address stored in said subscanning address register to the subscanning change amount selected by said selector.

* * * * *